United States Patent
Suarez et al.

(10) Patent No.: US 10,782,990 B1
(45) Date of Patent: Sep. 22, 2020

(54) CONTAINER TELEMETRY

(71) Applicant: Amazon Technologies, Inc., Seattle, WA (US)

(72) Inventors: Anthony Joseph Suarez, Seattle, WA (US); Jia Bi Zhang, Seattle, WA (US); Christopher Brian Barclay, Seattle, WA (US); Anirudh Balachandra Aithal, Seattle, WA (US); Cornelle Christiaan Pretorius Janse Van Rensburg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 14/951,334

(22) Filed: Nov. 24, 2015

(51) Int. Cl.
*G06F 9/455* (2018.01)
*G06F 9/50* (2006.01)

(52) U.S. Cl.
CPC ........ *G06F 9/45558* (2013.01); *G06F 9/5005* (2013.01); *G06F 2009/4557* (2013.01)

(58) Field of Classification Search
CPC combination set(s) only.
See application file for complete search history.

(56) References Cited

U.S. PATENT DOCUMENTS

| | | | |
|---|---|---|---|
| 4,625,081 A * | 11/1986 | Lotito | H04M 3/53316 379/196 |
| 7,805,706 B1 | 9/2010 | Ly | |
| 8,434,080 B2 * | 4/2013 | Yendluri | G06F 9/5072 717/177 |
| 8,621,069 B1 | 12/2013 | Tompkins | |
| 8,756,302 B2 * | 6/2014 | Cowan | G06F 11/3409 709/223 |
| 8,788,855 B2 | 7/2014 | Cong | |

(Continued)

FOREIGN PATENT DOCUMENTS

| | | | | |
|---|---|---|---|---|
| WO | 2014047073 A1 | 3/2014 | | |
| WO | WO-2015126292 A1 * | 8/2015 | ............... | G06F 9/54 |

OTHER PUBLICATIONS

Dang, Q., "Recommendation for Applications Using Approved Hash Algorithms" NIST Special Publication 800-107, Revision 1, National Institute of Standards and Technology (NIST), Aug. 2010, retrieved Nov. 24, 2015, from http://csrc.nist.gov/publications/nistpubs/800-107-rev1/sp800-107-rev1.pdf, 25 pages.

(Continued)

*Primary Examiner* — Jung W Kim
*Assistant Examiner* — Bruce S Ashley
(74) *Attorney, Agent, or Firm* — Davis Wright Tremaine LLP

(57) ABSTRACT

At least one instance of an application is launched in a set of software containers that are distributed among a set of virtual machine instances. A set of measurements corresponding to resource utilization by a software container of the set of software containers is obtained and a timestamp is generated for the set of measurements. The set of measurements is aggregated, with other sets of measurements corresponding to the set of software containers for the application, into a set of aggregated measurements grouped in a time window group, based at least in part on the timestamp, and, as a result of fulfillment of a condition, the time window group is outputted.

20 Claims, 13 Drawing Sheets

(56) References Cited

U.S. PATENT DOCUMENTS

| | | | |
|---|---|---|---|
| 9,203,613 B2 | 12/2015 | Roth | |
| 9,256,467 B1 | 2/2016 | Singh | |
| 9,405,569 B2* | 8/2016 | Greden | G06F 9/45545 |
| 2004/0040025 A1 | 2/2004 | Lehtinen | |
| 2006/0136928 A1 | 6/2006 | Crawford, Jr. | |
| 2007/0118657 A1 | 5/2007 | Kreitzer | |
| 2012/0166644 A1* | 6/2012 | Liu | G06F 9/4856 709/226 |
| 2013/0007088 A1* | 1/2013 | Alfredo | G06F 9/5066 709/201 |
| 2013/0191527 A1 | 7/2013 | Ashok et al. | |
| 2013/0297964 A1 | 11/2013 | Hegdal et al. | |
| 2014/0149986 A1 | 5/2014 | S M et al. | |
| 2015/0010151 A1* | 1/2015 | Roelse | H04N 21/26613 380/210 |
| 2015/0242197 A1* | 8/2015 | Alfonso | G06F 8/65 717/173 |
| 2016/0217700 A1* | 7/2016 | Zimmer | G09B 5/08 |

OTHER PUBLICATIONS

Roth, G.B., et al., "Techniques for Client Constructed Sessions," U.S. Appl. No. 13/248,953, filed Sep. 29, 2011, now U.S. Pat. No. 9,203,613.

Singh, D., et al., "System for Managing and Scheduling Containers," U.S. Appl. No. 14/538,663, filed Nov. 11, 2014, now U.S. Pat. No. 9,256,467.

Soltesz, S., et al., "Container-Based Operating System Virtualization: A Scalable, High-Performance Alternative to Hypervisors," Proceedings of the 2nd ACM SIGOPS/EuroSys European Conference on Computer Systems, Mar. 21-23, 2007, Lisbon, Portugal, ACM SIGOPS Operating Systems Review 41(3):275-287.

Xavier, M.G., et al., "Performance Evaluation of Container-Based Virtualization for High Performance Computing Environments," 2013 21st Euromicro International Conference on Parallel, Distributed, and Network-Based Processing, Feb. 2013, pp. 233-240.

Zhao, M., and R.J. Figueiredo, "Experimental Study of Virtual Machine Migration in Support of Reservation of Cluster Resources," In Proceedings of the 2nd International Workshop on Virtualization Technology in Distributed Computing, Nov. 12, 2007, Reno, Nevada, pp. 1-8.

He et al., "Elastic Application Container: A Lightweight Approach for Cloud Resource Provisioning," 26th IEEE International Conference on Advanced Information Networking and Applications, Mar. 26, 2012, pp. 15-22.

International Search Report and Written Opinion dated Feb. 4, 2016, International Patent Application No. PCT/US2015/059983, 12 pages.

Van et al., "SLA-aware Virtual Resource Management for Cloud Infrastructures," IEEE Ninth International Conference on Computer and Information Technology, Oct. 11, 2009, pp. 357-362.

* cited by examiner

CONTAINER TELEMETRY

BACKGROUND

Software containers can allow multiple applications to quickly launch and run within isolated user spaces without overhead associated with starting and maintaining separate virtual machines. Companies and individuals have turned to these software containers for automated application deployment on virtual machine instances being remotely hosted by distributed computing systems of computing resource service providers. However, in order to determine whether to allocate more or fewer resources to a cluster of virtual machine instances running in software containers, it is important to have real-time information on amounts of resources, such as processor and memory utilization, currently in use. Unfortunately, when large numbers of virtual machine instances having different amounts of resources are running in parallel, tracking resource utilization is problematic. Furthermore, it is difficult to secure such telemetry data from tampering, replay attacks, and data corruption. Moreover, it is challenging to minimize data loss and unnecessary duplication of work in the event of hardware or software failures.

BRIEF DESCRIPTION OF THE DRAWINGS

Various techniques will be described with reference to the drawings, in which.

DETAILED DESCRIPTION

Figure 1:
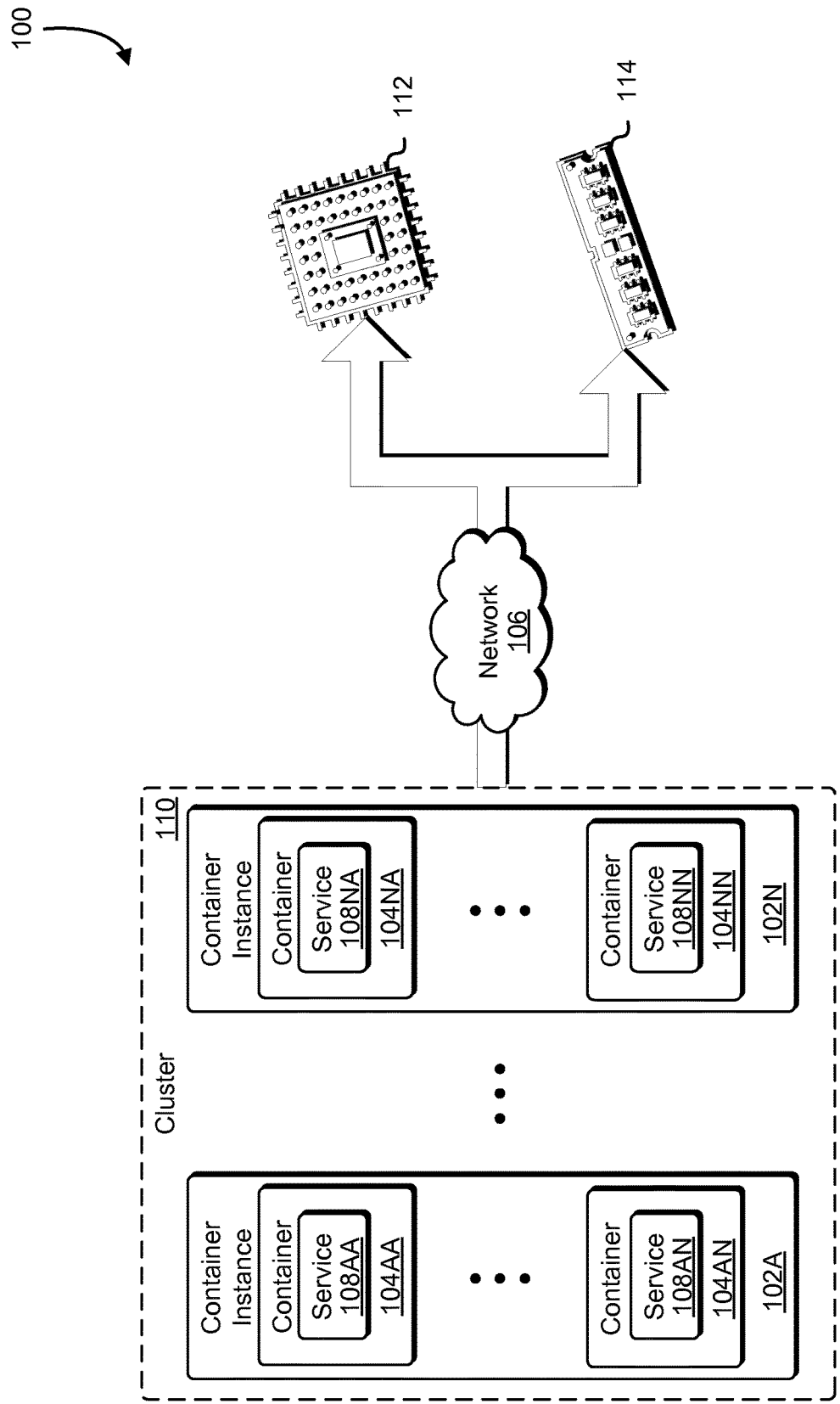
FIG. 1 illustrates an example of container telemetry in accordance with an embodiment.

In some examples, a customer of a computing resource service provider providing computing resources capable of supporting execution of software containers has a service (e.g., software application for processing data, etc.) that the customer desires to run in one or more software containers in a cluster of one or more container instances (which may be virtual machine instances capable of hosting software containers). That is, the customer may have an account with the computing resource service provider and have an associated account identifier that associates the customer with the cluster of container instances. Security roles and policies associated with this account identifier enable the customer to make requests, through a computing device, to perform various administrative functions such as launching the service and/or other applications in container instances of the cluster.

Resource requirements of the software containers may be specified in a task definition, which may be stored in a file or database, and, when a software container is to be launched, a container scheduler may select, from the cluster of container instances, a container instance capable of supporting the resource requirements of the software container as specified by its respective task definition. For example, the customer may request that an application requiring 10 processing units (e.g., as specified in a task definition) be launched and run as a software container. In this example, a virtual machine instance with 400 out of 500 processing units utilized would be capable of supporting the application, and the container scheduler may launch and run the software application in such a virtual machine instance. However, a virtual machine instance with 395 out of 400 processing units utilized would be incapable of supporting the application, and a container scheduler would bypass that virtual machine instance in favor of a virtual machine instance having enough resources available to support the requested application. In an event where no virtual machine instances of a cluster are capable of supporting the application (e.g., the virtual machine instances of the cluster are fully utilized or otherwise have insufficient free resources available to meet the minimum resource requirements of the application), an autoscaling group may add additional container instances to the cluster in which to launch and execute the application.

Consequently, after receiving a request from the customer, from a computing device under the control of the customer, or from an entity authorized by the customer to launch the service in a cluster of container instances associated with an account of the customer, the system of the present disclosure may launch the service in one or more software containers as specified by the requestor. That is, the customer may specify that multiple instances of some services be launched to run parallel, and, as a result, the system may launch multiple software containers within the cluster to execute the multiple instances.

In some examples, a software agent may be launched to execute in a container instance that hosts software containers, and this software agent may collect telemetry metrics from the software containers running in the container instance and report those telemetry metrics to a telemetry agent communication service, telemetry service, or some other service or component of the computing resource service provider. In some cases, the software agent may be an agent specifically dedicated to collecting and reporting telemetry metrics. In other cases, the software agent may be a multipurpose instance agent, at least some of whose functions include collecting and reporting telemetry metrics. In still other cases, the software agent may be a container agent configured to perform multiple container-related management operations, some of which include collecting and reporting telemetry metrics.

Because container instances in the cluster may be configured differently and have different resource allocations, the telemetry metrics may be normalized to account for differences in container instance configurations. For example, underutilization or overutilization of a first virtual machine will have a greater impact on the cluster than a second virtual machine instance if the first virtual machine instance has greater processing and/or memory resources than a second virtual machine instance. Consequently, one method of normalizing may include multiplying the current resource utilization of a container instance by the total resource allocation of the container instance, and then dividing by the collective resources of the cluster. As an example, if, in a cluster of two virtual machine instances, a first virtual machine instance has been allocated six processing units and a second virtual machine instance has been allocated eight processing units (for a total of 14 processing units for the cluster), resource utilization may be normalized by multiplying the current resource utilization of a virtual machine instance by 6/14, in the case of the first virtual machine instance, or by 8/14, in the case of the second virtual machine instance. In this manner the resource contribution of the virtual machine instances in the cluster are taken into account.

To determine contribution of a particular service to resource utilization in the cluster, a telemetry agent communication service of the system of the present disclosure may aggregate reported telemetry metrics associated with the same service (but executing in different containers) into a single grouping of telemetry metrics. In other words, telemetry metrics may be aggregated to be on a per-service basis. These aggregated telemetry metrics may be provided to an agent communication service, front-end service, or other service, such as a data streaming service, whereupon the data may be compressed and streamed. Note that telemetry metrics may be aggregated according to various levels. For example, telemetry metrics may be aggregated by cluster, by physical computing host, by virtual machine instance type, by user or client, and so on. In some embodiments, customers may apply a "label" to their software containers (e.g., an identifier may be assigned to a group of software containers), and telemetry metrics corresponding to software containers having the same label may be aggregated. In this manner, aggregation can be applied to arbitrary groupings, which, combined with autoscaling of the cluster based on aggregated telemetry measurements of a group being above or below a threshold, allows for additional flexibility for scaling the cluster.

From the data streaming service, the aggregated telemetry metrics may be streamed as messages to a telemetry metrics processor and sequenced. The telemetry metrics processor may group the messages according to time window, and upon determining that enough messages have been received to represent the resource utilization by the service for the particular time window accurately, the messages in that time window may be processed and output to a telemetry service. The telemetry service may perform any of a variety of actions based on the received output, such as displaying the process telemetry metrics in a graphical user interface for the customer, communicating the output to autoscaling service so that the autoscaling service can make a determination whether to add container instances to the cluster or remove container instances from the cluster, send alert messages indicating that resource usage has fallen above or below a threshold to a device of the customer or to an entity tasked with administrating the cluster, and so on.

Techniques described and suggested in the present disclosure improve the field of computing, specifically the field of computer virtualization, by providing accurate assessments of resource usage by large numbers of software containers running services in a virtualized environment, which may be used by an autoscaling service to add container instances to the virtualized environment (if resources are low/overutilized) or remove container instances from the virtual environment if (resources are underutilized). Additionally, techniques described and suggested in the present disclosure can improve the security and accuracy of telemetry data by electronically signing each message containing telemetry data with the signing key that can be verified as having originated from an authorized container instance. Moreover, techniques described and suggested in the present disclosure are necessarily rooted in computer technology in order to overcome problems specifically arising with processing large volumes of telemetry data by aggregating telemetry metrics on a per service basis.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect of an environment 100 in which an embodiment may be practiced. As illustrated in FIG. 1, the environment 100 may include a cluster 110 of container instances 102A-02N running one or more services 108AA-NN in software containers 104AA-04NN. The container instances 102A-02N may also be reporting, through the network 106, processor utilization 112 and memory utilization 114. Note that, although the present disclosure makes frequent reference to processor/processing and memory resources, it is contemplated as within the scope of the present disclosure that other types of computing resources may be tracked and processed in a same or similar manner. Such other types of resources may include resources such as persistent storage resources, network bandwidth, power, database resources, cooling/temperature resources (e.g., a task definition may specify that the application should not be run on a host that is operating at a temperature above a specified threshold, etc.).

In some examples, a "container instance" may refer to a computer system instance, virtual or non-virtual (e.g., a physical computer system running an operating system), that is configured to launch and run software containers. Thus, the container instances 102A-02N may be virtual machines configured to launch and execute the software containers 104AA-04NN. A "software container" (also referred to as a "container" for short) may be an isolated user space instance. That is, a software container may be a lightweight virtualization instance running under a computer system instance that includes programs, data, and system libraries. When a software container is run, the running program (i.e., the process) is isolated from other processes running in the same computer system instance. Thus, multiple software containers may each run under an operating system (e.g., using memory, CPU, and storage allocated to the software container by the operating system) of a container instance and execute in isolation from each other (e.g., each software container may have an isolated view of the file system of the operating system). Each software container may have its own namespace, and applications running within the software container may be isolated by only having access to resources available to the container namespace. In this manner, software containers may be an effective way to run one or more single applications within their own namespace without overhead associated with starting and maintaining virtual machines for running separate user space instances. Examples of systems for managing software containers include the Docker container engine and the CoreOS Rocket container engine.

Software containers may be launched to have only specified amounts of resources from resources allotted to the container instance under which the software container is running; that is, a task definition may specify that a software container only utilize a specified amount of memory and/or a specified amount of processing power. In some examples, a "task definition" or "task definition file" may refer to a file specifying a set of linked software containers (i.e., a set of software containers that, when running on a host computing system, are associated with each other) that are assigned to start as a group. The task definition file may be provided by the customer. The task definition file may be written in any suitable format, including JavaScript Object Notation (JSON), Extensible Markup Language (XML), or some other format. The task definition file may further specify disk and network locations that the software containers 104AA-04NN are able to share on a single physical machine. The task definition file may then be utilized for launching the set of software containers 104AA-04NN. In some implementations, the task definition file defines and links software containers spread across multiple physical machines. One task definition file may contain information for specifying many tasks and for scheduling many tasks. In some examples, a "task" may refer to an instantiation of a task definition file, and may correspond to one or more of the software containers 104AA-04NN. The task definition file may contain all the information needed to place the software containers 104AA-04NN in the cluster 110. The cluster 110 may be managed through application programming interface calls by the customer or by an entity, such as a computing device of the container service, authorized by the customer. The services 108AA-NN may be one or more software applications configured to execute in the software containers 104AA-04NN and process data.

One or more container instances may comprise the cluster 110. In some examples, "cluster" may refer to a set of one or more container instances that have been registered to (i.e., as being associated with) the cluster 110. The cluster 110 may be associated with an account of a customer of a computing resource service provider that may be providing a container service to the customer for running the software containers 104AA-04NN. Thus, the container instances 102A-02N may include many different container instances registered to a particular cluster. The network 106 represents the path of communication between the computing devices of the cluster 110 and an entity receiving the resource utilization information. Examples of the network include the Internet, a local area network, a wide area network and Wi-Fi.

Individual software containers of the software containers 104AA-04NN may have one or more virtual processors and an allocation of virtual memory, which may be a share of the processing and memory resources of the software container's respective container instance. The processor utilization 112 may be information corresponding to an amount of processor utilization by the software containers 104AA-04NN. Depending on the particular implementation, processor utilization 112 may take any of a variety of forms, including a value reflecting individual virtual or real processor utilization by a software container, a summation of virtual or real processor utilization by a plurality of the software containers 104AA-04NN in the cluster 110, an average (e.g., mean, median, mode, etc.) of virtual or real processor utilization by an individual or collective plurality of the software containers 104AA-04NN over a particular range of time, a minimum or maximum virtual or real processor utilization, a proportion of virtual or real processor utilization by individual or collective plurality of the software containers 104AA-04NN to available virtual or real processor resources, and so on. The processor utilization 112 value may be for a particular software container at a particular point in time, may be for the software containers 104AA-04NN collectively at a particular point in time or range of time, may be for software containers running on a particular physical system at a particular point in time or range of time, for software containers running a particular service in the cluster 110 at a particular point in time or range of time, may be for software containers running a particular service on a particular physical system at a particular point in time or range of time, various combinations of the above, and so on.

Likewise, depending on the particular implementation, the memory utilization 114 may be a value reflecting individual or real memory utilization by a software container, a summation of virtual or real memory utilization by a collective plurality of the software containers 104AA-04NN in the cluster 110, an average (e.g., mean, median, mode, etc.) of virtual or real memory utilization by individual or collective plurality of the software containers 104AA-04NN in the cluster 110 over a range of time, a minimum or maximum virtual or real memory utilization by an individual or collective plurality of the software containers 104AA-04NN, a proportion of virtual or real memory utilization of individual or collective plurality of the software containers 104AA-04NN to available virtual or real memory resources, and so on. The memory utilization 114 value may be for a particular software container at a particular point in time or range of time, may be for the software containers 104AA-04NN collectively at a particular point in time or range of time, may be for software containers running on a particular physical system at a particular point in time or range of time, for software containers running a particular service in the cluster 110 at a particular point in time or range of time, may be for software containers running a particular service on a particular physical system at a particular point in time or range of time, various combinations of the above, and so on.

The processor utilization 112 and the memory utilization 114 may be provided to an entity in response to a call to an application programming interface configured to respond with the processor utilization 112 and the memory utilization 114 in response to receiving the application programming interface call, provided the requester is authorized to have the application programming interface call fulfilled. In some implementations, the processor utilization 112 and the memory utilization 114 are provided as values to the requesting entity, in other limitations, the processor utilization 112 and the memory utilization 114 may be provided in a graphical interface to the customer corresponding to the cluster 110 or requesting entity.

Figure 2:
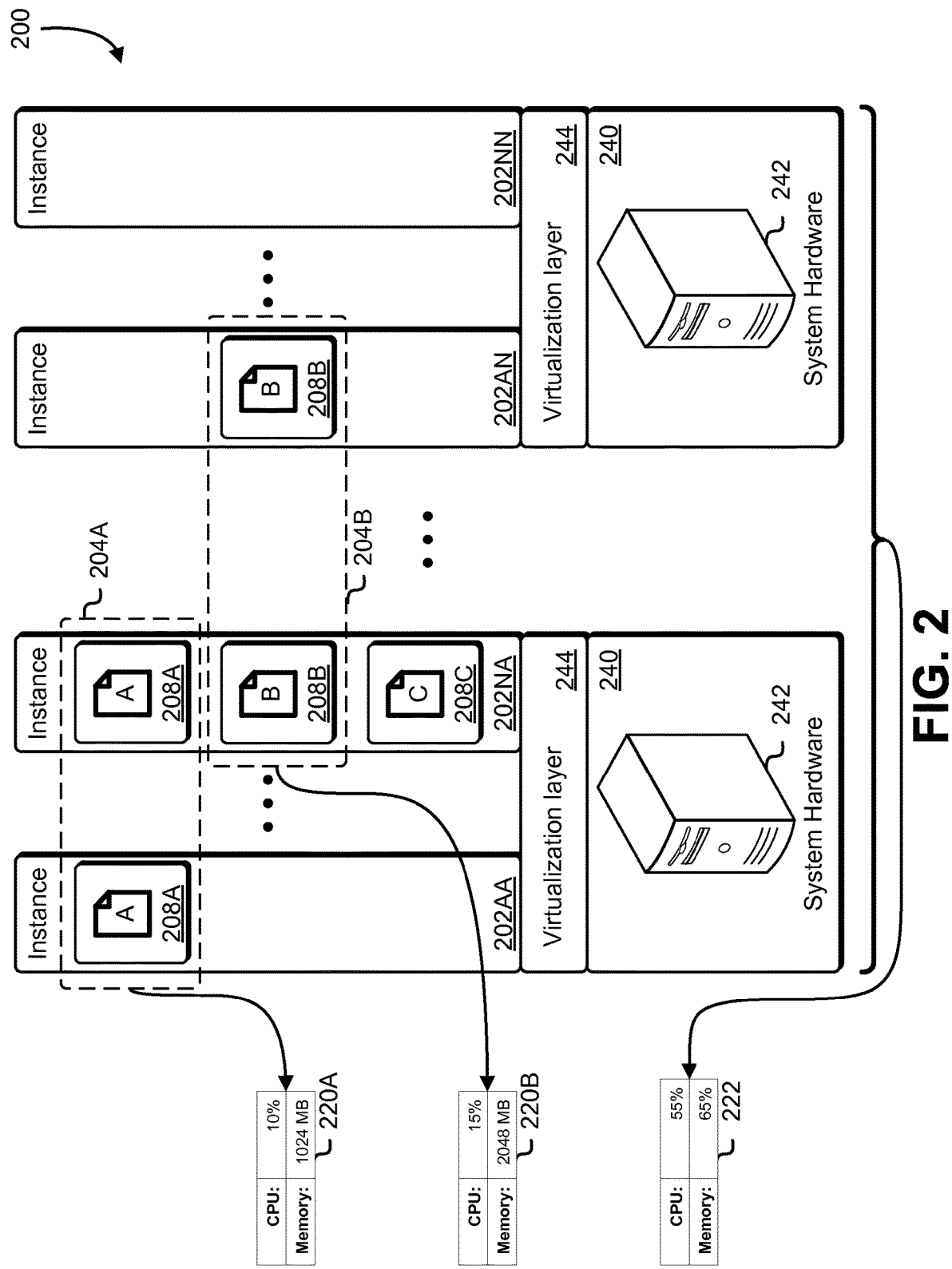
FIG. 2 illustrates an example of a distributed computing environment in accordance with an embodiment.

FIG. 2 illustrates an aspect of an environment 200 in which an embodiment may be practiced. As illustrated in FIG. 2, the environment 200 may include a distributed computing environment that includes one or more physical computing systems 242 hosting one or more virtual machines configured as container instances 202AA-02NN in accordance with at least one embodiment. Each of the physical computing systems 242 may be any device or equipment configured to execute instructions for performing data computation, manipulation, or storage tasks, such as a computer or a server. The physical computing systems 242 may be equipped with any needed system hardware 240, such as one or more processors (e.g., central processing units, graphics processing units, digital signal processors, etc.), memory (e.g., static and dynamic memory), buses, and input and output ports that are compliant with any handshaking, communications or data transfer protocol. The system hardware 240 may also include storage devices (e.g., storage disks, tapes, etc.) and networking equipment. The storage devices may be network storage devices managed by a data storage service, such as a block-level data storage service.

Virtualization layers 244 running under the system hardware 240 enable the system hardware 240 to provide computational resources upon which one or more container instances 202AA-02NN may operate. A virtualization layer may be any device, software, or firmware used for providing a virtual computing platform for the container instances 202AA-02NN. The virtualization layers 244 executing on the physical computing systems 242 enable the system hardware 240 to be used to provide computational resources necessary to support the container instances 202AA-02NN. Furthermore, the physical computing systems 242 may host multiple virtualization layers of the same or different types on the same system hardware 240. An example of a virtualization layer 244 is a hypervisor.

Each container instance 202AA-02NN may include various virtual computer components, such as one or more virtual processors, virtual memory, and virtual storage. The container instances 202AA-02NN may be provided to customers of a computing resource service provider providing the distributed computing environment. The customers may run an operating system and applications on the container instances 202AA-02NN.

Each container instance 202AA-02NN may include one or more software agents (not pictured; also referred to in the present disclosure as "agents" for short). Such software agents may be configured to allow a customer to manage his/her respective software containers 208A-08C and container instances 202AA-02NN by acting as a proxy between an external entity and the software containers software containers 208A-08C. The software agents may be further configured to perform logging of events and gather telemetry data related to the software containers 208A-08B and container instances 202AA-02NN. There may be different software agents for performing different tasks; for example, a telemetry agent may gather telemetry data about one or more of the software containers 208A-08C, an instance agent may act as a proxy between a respected instance and another entity, such as a telemetry agent communication service, and/or a container agent may manage the software containers 208A-08C and/or act as a proxy between the software containers 208A-08C and an external entity, such as the telemetry agent communication service. Note that agents may perform multiple functions; for example, rather than utilizing a separate telemetry agent, the instance agent may also perform the functions of a telemetry agent.

The services 204A-04B may be applications configured to run in software containers such as the software containers 208A-08C. As an example, a customer of a computing resource service provider may operate a website that sells products or services to consumers. The container instances 202AA-02NN may be allocated to the customer, and the customer may utilize the container instances to perform various functions related to the website. For example, the service 204A may be an application for processing credit card data of the consumers, and in order to process multiple sets of credit card data at the same time, the service 204A may be running in parallel in multiple instances in the software containers 208A. As another example, the service 204B may be a service that verifies address information of the consumers, and in order to serve consumer demand, the service 204B may be running in parallel in multiple container instances 202AA-02NN. The software container 208C may or may not be running a service application, and is depicted to illustrate that not all software containers need to provide services and that not all services necessarily are distributed over multiple container instances. Although the environment 200 only depicts one instance of a services running within a single container instance, it is contemplated that there may be cases where a service may run in multiple software containers within the same container instance.

The utilization data 220A-20B may be values reflecting resource utilization by the particular service. For example, the utilization data 220A may indicate an amount of processor capacity in use by and an amount of memory allocated to the service 204A at a certain point in time. Likewise, the utilization data 220B may indicate an amount of processor capacity in use by and an amount of memory allocated to the service 204B. The cluster utilization data 222 may be values indicating an amount or proportion of available (i.e., unallocated) resources out of the total resources of the cluster. For example, as can be seen in the environment 200, 55 percent of the available processing resources of the cluster are being consumed by the container instances 202AA-02NN, and 65 percent of the available memory has been allocated or is in use by the container instances 202AA-02NN. It is important to note that, although the present disclosure uses examples of resource utilization, such as processor and memory utilization, the telemetry metrics described in the present disclosure as resource utilization may include various types of measurements related to execution of the services 204A-04B, such as network utilization, network bandwidth, health levels for persistent storage or for servers, duration (e.g., average, peak, etc.) of task execution, network throughput, disk input/output rates, average peak processor utilization, frequency of processor utilization spikes, and so on. For example, if it is determined that services are taking too long (e.g., above a threshold amount of time, on average) to run, more container instances may be spawned for the cluster. The system of the present disclosure may make scheduling and resource decisions as described in the present disclosure based on these and other measurements/metrics.

Customers of a computing resource service provider may utilize virtual machine instances, such as the container instances 202AA-02NN, for running any of a variety of applications. Those instances have various resources, such as processors and memory that are allocated to the instances from the available physical processing capability and memory of the system hardware 240 hosting the instances. A software container service, such as the software container service described in U.S. patent application Ser. No. 14/538,663, entitled "SYSTEM FOR MANAGING AND SCHEDULING CONTAINERS," incorporated by reference herein, may allow such customers to create software containers to run processes in an isolated fashion inside those instances. Those software containers may also be allocated a share of processing capability and memory from the share allocated to the instance in which the software container is running.

The techniques of the present disclosure provide the customer associated with the cluster with a way to monitor the resource utilization of the cluster of container instances 202AA-02NN and/or the resource utilization of the services 204A-04B running in the cluster of container instances 202AA-02NN. In this manner, the customer, or an entity (e.g., an autoscaling entity) authorized by the customer, can determine whether the cluster should be scaled up or down (i.e., virtual machine instances added or removed from the cluster) in order to meet the demand for the services 204A-04B. In some of these autoscaling embodiments, the utilization data 220A-20B may be noted (first utilization measurement) prior to scaling the cluster up or down and again (second utilization measurement) at a time after scaling the cluster up or down. The first and second measurements may be compared and actions may be performed based at least in part the comparison. For example, if scaling the cluster down appears to correspond with errors in the cluster or with a spike in resource utilization of the cluster above a threshold, the system of the present disclosure may "roll back" the scaling to re-add virtual machine instances to the cluster. Likewise, if deploying a new service appears to correspond to errors in the cluster or with a spike in resource utilization of the cluster above a threshold, the system of the present disclosure may "roll back" the deployment to restore a previous version of the service. Additionally or alternatively, the system may, in such cases, automatically send an error report or notification to the customer associated with the cluster or to a system administrator for the cluster.

Additionally or alternatively, utilization data may be used to provide real-time metrics to a workload scheduler to improve system stability. That is, the utilization data 220A-20B may be aggregated by instance rather than by service, which may allow the workload scheduler to use real time metrics to input into a scheduling process. Based on the real-time metrics, the workload scheduler may refrain from scheduling tasks on busy machines or move tasks from busy machines onto less busy machines. That is, based on the utilization data, the workload scheduler may make determination on which virtual machine instance should receive the next workload. For example, if resource utilization indicates that certain virtual machine instances in the cluster are more or less utilized than others, the workload scheduler may take this information into account and determine to send the next workload to less utilized virtual machine instances over the more utilized virtual machine instances. In this manner, utilization data may influence scheduling decisions to avoid (or, in some cases, prefer) "hot" instances (i.e., instances with resource utilization above a threshold).

As another example, memory utilization data may indicate that a first container instance is at or above a predetermined threshold for memory utilization. A workload scheduler may determine, based at least in part on this memory utilization data, to move existing tasks to a second container instance that is utilizing less memory and/or stop scheduling more tasks for the first container instance. In some implementations, the workload scheduler may not select a container instance for the tasks at random. In other implementations, the workload scheduler may select a least-utilized container instance for the tasks. In still other implementations, the workload scheduler may avoid selecting the least-utilized container instance or computing system for the tasks in order to hold that instance or system in reserve.

Furthermore, utilization data may be grouped according to task definition or task definition version/label. Grouping utilization according to task definition may allow automatic roll back of services during software deployments based on changes in resource utilization. For example, if a certain task definition is overutilizing or underutilizing the cluster, the cluster may be scaled up, down, or rolled back accordingly. For example, a first set of utilization data may be obtained (first utilization measurement) before deploying a software application to the cluster. Then, after deployment, a second set of utilization data may be obtained (second utilization measurement) and compared with the first set. If the difference is too costly (e.g., the difference indicates that processing utilization or memory utilization has now exceeded a predetermined threshold), the change (e.g., the software deployment) may be undone/rolled back automatically. In some embodiments, the predetermined threshold may be specified by the customer associated with the cluster.

As described above, resource allocation to the software containers 208A-08C may be specified in a task definition file. Consequently, a distinction should be made between "actual" processor and memory utilization and "reserved" processor and memory. Resource allocations specified by the task definition file are "reserved" values. For example, the task definition:

{
"CPU": 10,
"Memory": 20
} specifies that the software container associated with the task definition file should reserve 10 units of processing capability and 20 units of memory. Processing reservation may be a minimum reservation, while memory reservation may be a maximum reservation. In other words, the reservation of 10 units of processing capability may be a guarantee that the software container will have no less than 10 units of processing capability available, and may be provided more processing units if more are available. On the other hand, the reservation of 20 units of memory may be a guarantee that the software container has exclusive use of the 20 units of memory even though the software container need not use it all.

Figure 3:
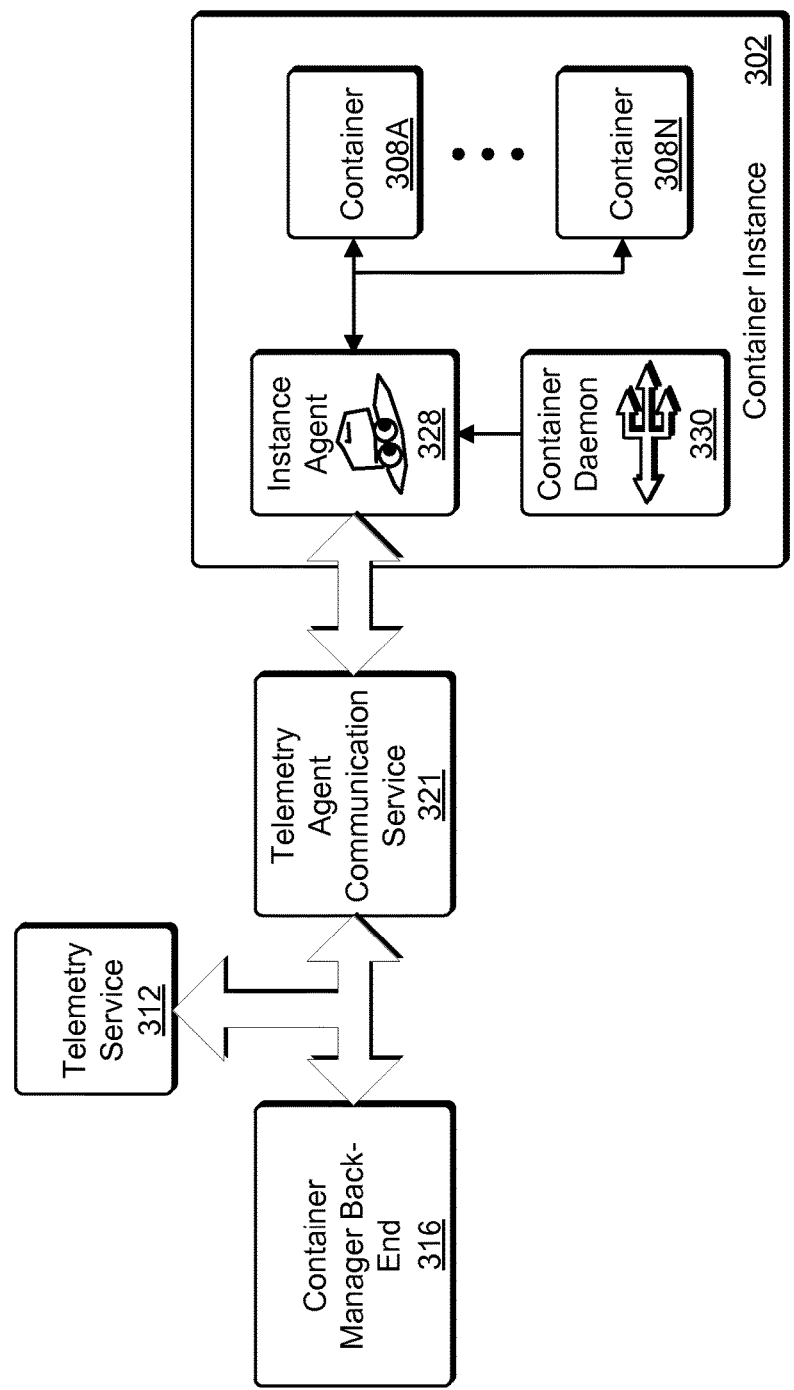
FIG. 3 illustrates an example of communication pathways of a container instance in accordance with an embodiment.

A scheduler, such as the scheduler described in U.S. patent application Ser. No. 14/538,663, incorporated by reference herein, may determine in which container instance to launch a particular software container based on the resource needs indicated in the software container's respective task definition. For example, if it is desired to instantiate a software container requiring processing capability of 10 units, the software container may be launched in a container instance that is using 400 out of 500 processing units (i.e., 100 processing units are available/unallocated). On the other hand, such software container may not be launched in a container instance that is using 395 out of 400 processing units (i.e., only five processing units are available/unallocated, and consequently cannot support a requirement for an additional 10 units). A unit of processing capability differ from implementation to implementation. In one example, each processor core in the system hardware 240 may be said to have 1024 processing units. FIG. 3 provides further detail on how resource utilization data may be captured.

FIG. 3 illustrates an aspect of an environment 300 in which an embodiment may be practiced. As illustrated in FIG. 3, the environment 300 may include a set of software containers 308A-08N launched within a container instance 302 being monitored by an instance agent 328. The set of software containers 308A-08N may also be supplying metrics and log information to the instance agent 328. The instance agent 328, in turn, may communicate monitoring information via an agent communication service 321, which itself may communicate with a container manager back-end 316 and/or a telemetry service 312. In implementations where a telemetry agent operates independently from the instance agent 328, the instance agent 328 may also be in communication with the telemetry agent, and the instance agent 328 may periodically monitor the health of the telemetry agent to ensure that the telemetry agent is running. If such telemetry agent stops running or otherwise encounters an error, the instance agent 328 may cause the telemetry agent to restart if needed. In some of these embodiments, the instance agent 328 provides information about the status of the telemetry agent and/or the set of software containers 308A-08N to the telemetry agent communication service 321 in response to receiving an application programming interface call from the telemetry agent communication service 321 requesting such information. The instance agent 328 or telemetry agent may communicate the metrics and log information to a telemetry service 312. In some embodiments, the telemetry agent communicates directly to the telemetry service 312, while in other embodiments the instance agent 328 or telemetry agent communicates with the telemetry service 312 via an application programming interface call to the telemetry agent communication service 321.

The set of software containers 308A-08N, may be running virtualized instances (also referred to as tasks) of varying lifespans (e.g., short-term batch jobs, long-term background processes, etc.) that have been isolated from other processes within the container instance 302. Metrics about the set of software containers 308A-08N may be gathered by the instance agent 328 or telemetry agent, aggregated, and provided to the telemetry service 312. In some examples, telemetry metrics (also referred to as telemetry "measurements") may refer to control group metrics and log event information about the running software containers. Control group metrics may include information such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers.

The instance agent 328 may act as a go-between (i.e., proxy) for the software containers 308A-08N and resources, services, and other entities outside the namespaces of the set of software containers 308A-08N. In some implementations, the set of software containers 308A-08N are configured to share external resources, such as block-level data storage volumes. In some of these implementations, access to and communication with the shared external resources by the software containers 308A-08N are made through the instance agent 328. In other implementations, the container instance 302 or operating system of the container instance 302 support allowing the software containers 308A-08N to access or communicate with the shared resources without going through the instance agent 328.

Note, in some embodiments, the scheduler communicates with the agent communication service 321 or directly to the instance agent 328 to instruct the instance agent 328 to launch tasks. In other embodiments, the scheduler communicates the placement and launching instructions to the container manager back-end 316, which subsequently causes the software containers to be launched according to placement orders from the scheduler, such as by communicating the launch instructions to the instance agent 328 directly or through the agent communication service 321.

As noted, the instance agent 328 may be configured to gather metrics and log information about the set of software containers 308A-08N running within the container instance 302 and pass the gathered metrics and log information to the telemetry service 312. In some implementations, the instance agent 328 itself runs in a software container that launches in conjunction with creation of the container instance 302. In other implementations, the instance agent 328 is a process running under the operating system of the container instance 302 and is configured to receive metrics and log information directly from the set of software containers 308A-08N. As noted, in some implementations the operations described in this paragraph are performed by a separate telemetry agent instead of the instance agent 328.

One function of the container daemon 330 is to periodically output processor utilization and memory utilization (cumulatively referred to as "resource utilization") data by the set of software containers 308A-08N in the container instance 302. In some embodiments, the container daemon 330 outputs the resource utilization data to a file system. In some implementations the container daemon 330 outputs the resource utilization data of a particular container to a file system of the particular container. The instance agent 328 may periodically collect the resource utilization data and forward it to the telemetry agent communication service 321. In some implementations, this function may be performed by a separate telemetry agent (not shown). The telemetry agent communication service 321 may then aggregate the resource utilization data received from the instance agent 328 (or telemetry agent, as noted) and provide the resource utilization data to the telemetry service 312.

Once the instance agent 328 (or telemetry agent) sends the resource utilization data in a message to the telemetry agent communication service 321, the telemetry agent communication service 321 may aggregate and group the resource utilization data. The message (also referred to as a "record") may include information such as a timestamp for the information (indicating when the information was collected, measured, or sent to the telemetry service 312 or to a streaming service), an account identifier for the customer associated with the cluster, a resource name for the cluster, telemetry metrics/measurements, and so on. The resource utilization data may be aggregated and grouped in order to make the data more manageable for situations where the set of software containers 308A-08N comprise a large number (e.g., thousands) of software containers executing simultaneously in the container instance 302 or in multiple container instances. By batching the data from individual containers of the set of software containers 308A-08N, the data may be more easily processed.

Cluster size (e.g., which may be measured by a number of instances running in the cluster), may be inferred based on a number of messages received. Referring back to FIG. 2, as an example, the telemetry agent communication service 321 may first receive a message from the a first instance 202AA at a first time (message count=1) within a given interval of time, and later receive a message from a second instance 202NA (message count=1) within the same interval of time. The telemetry agent communication service 321 may aggregate the message counts individual software instances 202AA-02NA in the given interval of time as being message counts for the cluster as a whole (message count=1+1=2), and another message received within the given interval of time from either the first instance 202AA or 202NA may not be counted, as that instances has already been counted for the given interval of time. Further description of the aggregation of resource utilization data may be found in reference to FIG. 5.

In some embodiments, the messages sent to the telemetry agent communication service 321 are sent using a WebSocket Protocol as opposed to Hypertext Transfer Protocol (HTTP). In some of these embodiments, the messages are electronically signed, such as in a matter similar to the session-based signing described in in U.S. patent application Ser. No. 13/248,953, entitled "TECHNIQUES FOR CLIENT CONSTRUCTED SESSIONS," incorporated by reference herein. In other words, each message sent from the instance agent 328 to the telemetry agent communication service 321 may be sent as an electronically signed Web Socket message.

In some cases, the container instances 202AA-02NN of FIG. 2 may be of varying sizes. For example, container instance 202NA may be allocated two processor cores or container instance 202NA may be allocated 32 processor cores. More processor cores generally mean more processing capability (i.e., computing power) for the container instance. In some embodiments, the resource utilization data is normalized based on the resources allocated to the container instances 202AA-02NN.

Figure 4:
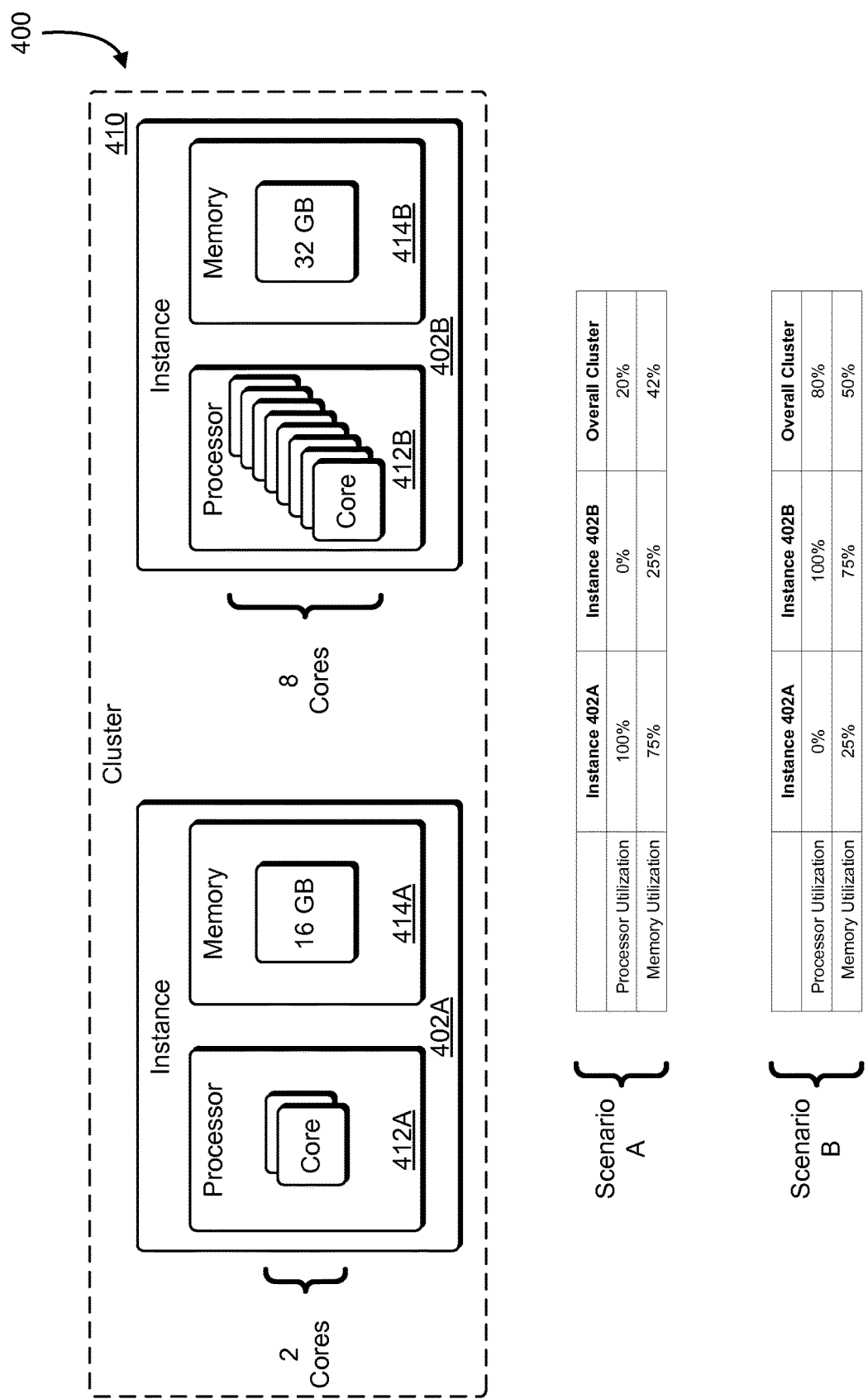
FIG. 4 illustrates an example of resource-based normalization in accordance with an embodiment.

FIG. 4 illustrates an example 400 of data normalization of an embodiment of the present disclosure. Specifically, FIG. 4 depicts a cluster 410 of container instances 402A-02B, which have been allocated different amounts of resources. The container instances 402A-02B may be container instances similar to the container instances 202A-02B of FIG. 2. As can be seen in the example 400, the container instances 202A-02B have been allocated different amounts of resources. In the example 400, a first container instance 402A has been allocated first processing resources 412A of two cores, while a second container instance 402B has been allocated second processing resources 412B of eight cores. Similarly, the first container instance 402A has been allocated first memory resources 414A of 16 gigabytes of memory, while the second container instance 402B has been allocated second memory resources 414B of 32 gigabytes of memory.

With the cluster 410, two scenarios are presented to illustrate normalization of the present disclosure. In a first scenario, the first container instance 402A has fully (100 percent) utilized the two cores in its first processing resources 412A, and the second container instance 402B is utilizing none (zero percent) of the cores in its second processing resources 412B. If the instances were weighted equally, the overall processor utilization of the cluster 410 would be 50 percent; however, this would not be an accurate reflection of the processing capability of the cluster 410, because, in actuality, only two of the 10 allocated cores are being utilized, leaving eight cores available for work. Consequently, the processor utilization for the cluster 410 may take into account the total allocated processing units (in this example, processing units reflecting a number of cores), which, in the example 400, is 10. As a result, since only two out of 10 processing units are being fully utilized, the normalized processor utilization for the cluster 410 in scenario A is 20 percent. Similarly, in the first scenario, the first container instance 402A is using 12 gigabytes (75 percent) of its first memory resources 414A, while the second container instance 402B is using eight gigabytes (25 percent) of its second memory resources 414B. Consequently, the normalized memory utilization in scenario A is approximately 42 percent (i.e., leaving 28 gigabytes available).

In a second scenario, the first container instance 402A has utilized none (zero percent) of its two cores in its first processing resources 412A, and the second container instance 402B has fully (100 percent) utilized the eight cores in its second processing resources 412B. Similar to the first scenario, if the instances were considered equal, the overall processor utilization of the cluster 410 would again be 50 percent; however, this too would not be an accurate reflection of the processing capability of the cluster 410, because, in actuality, eight of the 10 allocated cores are being utilized, leaving only two cores available for work. Consequently, the processor utilization for the cluster 410 may take into account the total allocated processing units (in this example, processing units reflecting a number of cores), which, in the example 400, is 10. As a result, since eight out of 10 processing units are being fully utilized, the normalized processor utilization for the cluster 410 in scenario B is 80 percent. Similarly, in the second scenario, the first container instance 402A is using four gigabytes (25 percent) of its first memory resources 414A, while the second container instance 402B is using 24 gigabytes (75 percent) of its second memory resources 414B. Consequently, the normalized memory utilization in scenario B is approximately 58 percent (i.e., leaving 12+8=20 gigabytes available). In some embodiments, rather than performing operations, such as querying a database to determine a size of a cluster (e.g., number of instances assigned to the cluster), the cluster size is inferred by counting a number of messages received from unique container instances over a range of time.

Figure 5:
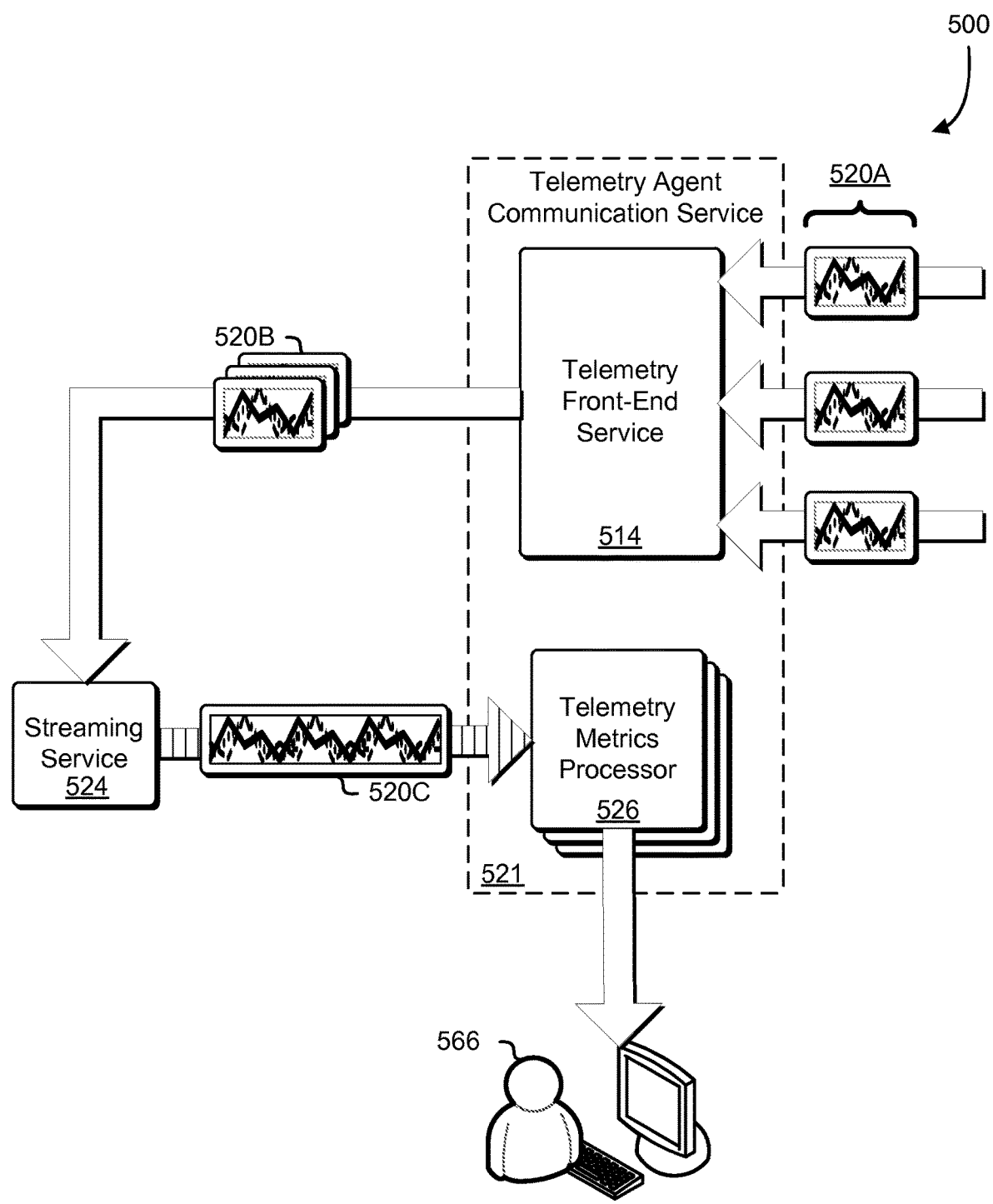
FIG. 5 illustrates an example of data aggregation and streaming in accordance with an embodiment.

FIG. 5 illustrates an example 500 data aggregation and streaming of an embodiment of the present disclosure. Specifically, FIG. 5 depicts the telemetry data 520A being provided to a telemetry front-end service 514 of a telemetry agent communication service 521, which, in turn, routes the grouped telemetry data 520B through a streaming service 524, which sends the streamed telemetry data 520C to a set of telemetry metrics processors 526. Upon completion of telemetry metrics processing, the telemetry metrics processor may provide the processed telemetry metrics to a telemetry service, such as the telemetry service 312 for display to the customer associated with the cluster from which the metrics originated or for storage in a persistent data store. Note that the operations of the various components depicted in the example 500, may be performed by one or more computing systems (also referred to as "hosts") of a distributed computing environment.

Each telemetry metrics processor of the set of telemetry metrics processors 526 may be a logical unit (e.g., an application thread) for processing the streamed telemetry data 520C and outputting the processed data to a destination such as a display of a customer 566 of a computing resource service provider providing a container service, or output the telemetry data to persistent storage, such as a database. Thus, there may be multiple telemetry metrics processors processing the streamed telemetry data 520C in parallel. In some examples, the term "customer" may refer to a system of a customer entity (such as an individual, company, or other organization) that utilizes services provided by the computing resource service provider. Examples of such a system may be an individual computing device, a mainframe, a customer accessible virtual machine instance, or other system capable of communicating with one or more of the provided services.

The telemetry data 520A may represent reports of resource usage from one or more software containers, such as the set of software containers 308A-08N of FIG. 3, running on one or more container instances, such as container instances similar to the container instance 302 of FIG. 3. The telemetry agent communication service 521 may be a service similar to the telemetry agent communication service 321 described in conjunction with FIG. 3. The telemetry front-end service 514 may be a service configured to aggregate the telemetry data 520A into groups that correspond to services, such as the services 204A-04B described in FIG. 2. Periodically (e.g., every minute, every 20 seconds, etc.) or according to some other scheme, the telemetry front-end service 514 may provide the grouped telemetry data 520B to the streaming service 524.

The streaming service 524 may compress the grouped telemetry data 520B according to a data compression scheme and send it to the set of telemetry metrics processors 526. In some embodiments, the streaming service 524 is configured to retain the grouped telemetry data 520B only for a limited amount of time, whereupon the grouped telemetry data 520B is erased from the memory/stores of the streaming service 524. A benefit of a streaming service configured to retain data only temporarily is that the data is not written to a persistent data store that requires frequent garbage collection of obsolete data. Instead, such a streaming service provides a time-limited buffer from which the grouped telemetry data 520B can be read at any time within the time limit of the buffer.

The set of telemetry metrics processors 526 may read the streamed telemetry data 520C from the streaming service 524 and perform various operations on the streamed telemetry data 520C in order to compute resource utilization values, such as calculating maximum values, minimum values, averages (e.g., mean, mode, median, etc.). In general, the set of telemetry metrics processors 526 may perform the operations in a straightforward manner; however, because some embodiments of the streaming service 524 do not utilize persistent state storage for the grouped telemetry data 520B/streamed telemetry data 520C, in the event of a failure, such as a host failure, techniques of the present disclosure known as "checkpointing" may be employed to ensure that processing of telemetry data can be resumed without losing data and with little to no duplicated work. Checkpointing effectively keeps track of the progress of the telemetry data 520A-20C so that if components of the system fail, data can be replayed/resent from the point of the most recent checkpoint.

It is contemplated that the system of the present disclosure may be implemented without the streaming service 524. However, advantages presented by a stream-based design include better throughput than non-stream-based designs. As noted above, stream-based systems may not provide a persistent data storage, but do typically provide durable data storage that survives across machine failures. The streaming service 524 may include the ability to read and write records in a deterministic order, and the ability to track progress of how far through the stream has been, the ability to checkpoint the progress, and resume from a host failure from where the stream left off. It is contemplated that in some embodiments, record data could be periodically (or according to some other scheme) copied into a persistent data store rather than checkpointing, at a possible cost of decrease in some throughput or scalability of the system.

Figure 6:
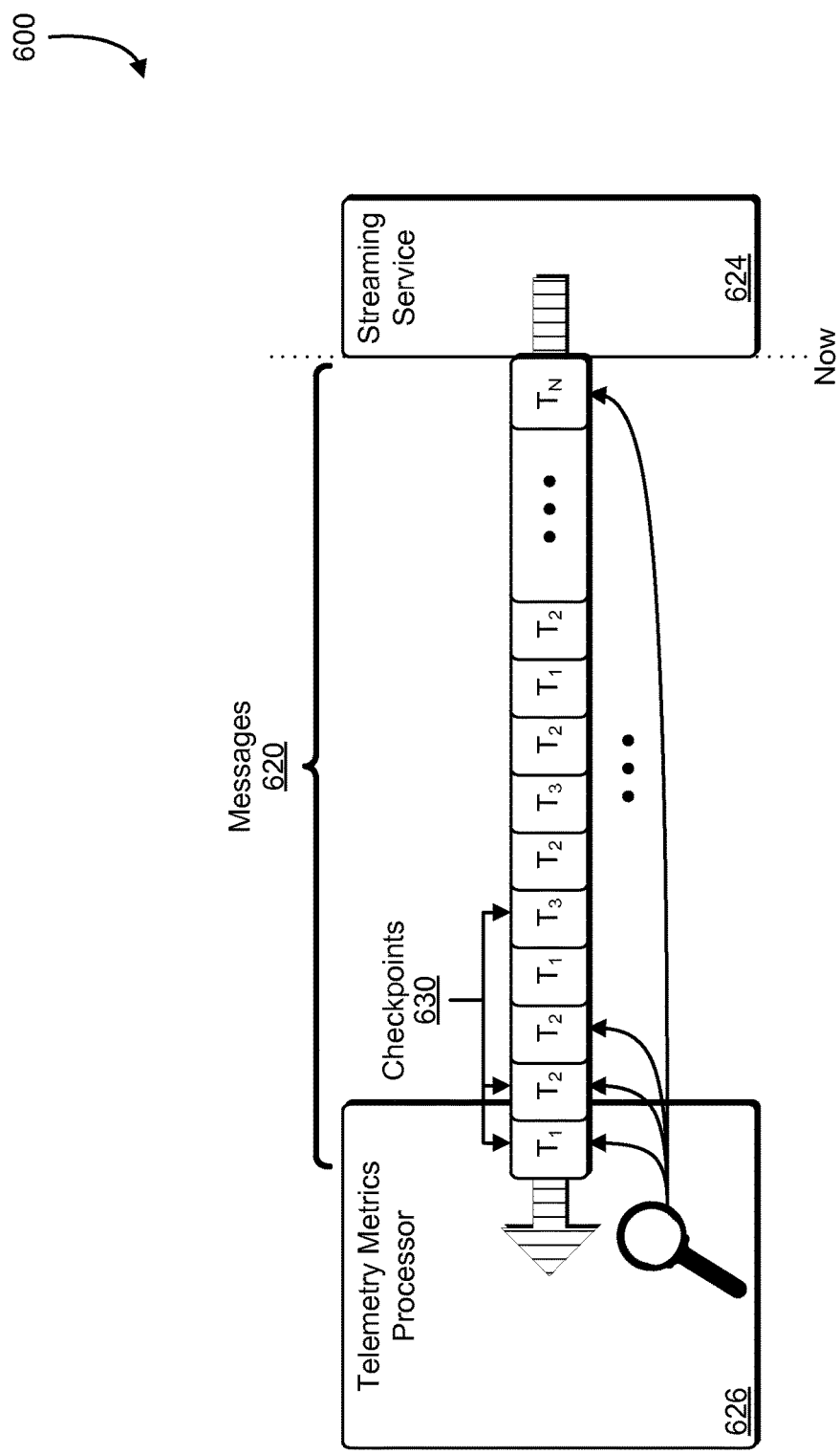
FIG. 6 illustrates an example of checkpointing in accordance with an embodiment.

The streaming service 524 includes an ability to sort the record stream along some dimension of the records read, and an ability to checkpoint progress in this sorted view of the record stream (see the messages 620 of FIG. 6). The streaming service 524 and may be a service shared with other services of the computing resource service provider providing the container telemetry service, and, for those other services, may stream data other than telemetry data.

Because messages are received/collected from container instances on a time basis, depending on how many container instances are running, how many software containers are running within the container instances, and in what manner that the computing systems of the cluster are connected, there may be large numbers of messages being sent/received within a period of time. A factor for determining whether to scale a cluster up or down, and by how much, may include a size of the cluster. The size of the cluster may be inferred by a number of messages received within a certain time period. For example, a customer may have approximately 100,000 container instances in the cluster, the exact number of which may fluctuate due to an autoscaling service that adds or removes container instances based on demand. If each of the container instances is sending resource utilization data every 20 seconds, repeatedly querying for the size of the cluster upon receipt of each message may become burdensome to the system. Instead, if container instances are sending messages according to some time period (e.g., every minute, every 20 seconds, etc.), the system of the present disclosure may infer the cluster size by counting how many messages were received within that time, or greater, period.

FIG. 6 illustrates an example 600 checkpointing in an embodiment of the present disclosure. Specifically, FIG. 6 depicts the messages 620 being streamed from a streaming service 624, similar to the streaming service 524 described in FIG. 5, to a telemetry metrics processor 626, similar to a telemetry metrics processor of the set of telemetry metrics processors 526 of FIG. 5. The telemetry metrics processor 626 may determine, according to a heuristic such as the algorithm described below, when to checkpoint the data. In the example 600, individual messages have been labeled $T_1$, $T_2$, $T_3$, etc. to reflect the particular time window in which they were sent. In some examples, the term "time window" may refer to an interval of time for grouping messages. For example, if the time windows are one minute in length, a message labeled $T_1$ may represent a message sent between 12:01:00 and 12:01:59 p.m.; a message labeled $T_2$ may represent a message sent between 12:02:00 and 12:02:59 PM; a message labeled $T_3$ may represent a message sent between 12:03:00 and 12:03:59 PM; and so on. In other words, in this example, a message with a timestamp of 12:02:43 p.m. would correspond to time window $T_2$; a message with the timestamp of 12:03:59 p.m. would correspond to time window $T_3$; and a message with the timestamp 12:01:01 p.m. would correspond to time window $T_1$; and so on. Note that the frequency in which a container instance, instance agent, or telemetry agent sends messages does not necessarily correspond to the time window. For example, a time window may be one minute in duration, while the container instance may be configured to report telemetry data every 20 seconds. In this example, for every time window, three messages from any given container instance should be sent/received (i.e., one at 20 seconds, one at 40 seconds, and one at 60 seconds) during the one-minute time window; however, due to various characteristics of hardware and network (e.g., latency and other delays), more or fewer messages may be sent to/received from a particular container instance in a given time window. As can be seen in the example 600, the messages 620 may not be received in the order in which they were sent. This effect may be caused by latencies, delays, and other factors in the distributed computing environment.

Progress may be tracked, not by individual messages 620, but by time window. The telemetry metrics processor may sort and group the messages 620 according to time window. For example, messages 620 corresponding to $T_1$ may be sorted and grouped in a first group; messages 620 corresponding to $T_2$ may be sorted and grouped in a second group; messages 620 corresponding to $T_3$ may be sorted and grouped in a third group; and so on. As each of the messages 620 are received, they may receive a sequence number indicating the order in which they were received. In the event of a failure, the system of the present disclosure may determine which time window was the most recent successfully processed time window of messages. The determination of the most recent successfully processed time window of messages may be made based on the checkpoints 630. The checkpoints 630 may be stored in a data store such as a database. In the event of a failure, a host can read the checkpoint 630 from the data store to determine from where to resume work without the set of telemetry metrics processors 526 outputting duplicate metrics.

As noted, the messages 620 may be assigned a sequence number reflecting an order in which they were received, but the sequence number may not reflect an order in which the messages were actually sent. As can be seen in the example 600, the timestamps of the messages 620 are out of order. In the example 600, a first message received is associated with the second time window $T_1$; the second message received is associated with the second time window $T_2$, as is the third message; but the fourth message received is again associated with the first time window $T_1$. However, the fifth message is associated with the third time window $T_3$; the sixth message is associated with the second time window $T_2$; and the seventh message is again associated with the third time window $T_3$. Again, the eighth message is associated with the first time window $T_1$ again; and the ninth message is again associated with the second time window $T_2$; and so on. Note that the messages are received with a timestamp, and are sorted and grouped into groups corresponding to the correct time window for the timestamp. In order to sort the messages into the correct time window, the messages 620 may be buffered up to a certain amount of time, and then the buffer may be read ahead to determine in which time windows the messages belong. However, in an event of a failure and the buffered messages are lost, the system of the present disclosure may determine, based on the checkpoints 630, from where to continue processing.

An algorithm of the present disclosure may be used to determine whether to create a checkpoint (also referred to as a "progress marker"). Although it is contemplated that other algorithms for checkpoint placement and generation may be used, the algorithm described in FIGS. 6 and 7 indicates placing/generating a checkpoint at a message that corresponds to a new time window. An effect of determining the checkpoints 630 in this fashion is that, if a record/message is received but indicated, by the checkpoints 630, as already having been processed, that record can be ignored and processing can continue to the next record. The checkpoint may comprise data including the sequence number for the most recent message processed (i.e., the sequence number corresponding to the progress marker). In some cases, the checkpoint may also include sequence numbers for messages processed since the previous checkpoint. In still other cases, the checkpoint may also include timestamps of the messages, an account identifier for the customer associated with the cluster from which the messages originated, a resource name for the cluster, and telemetry metrics.

Figure 7:
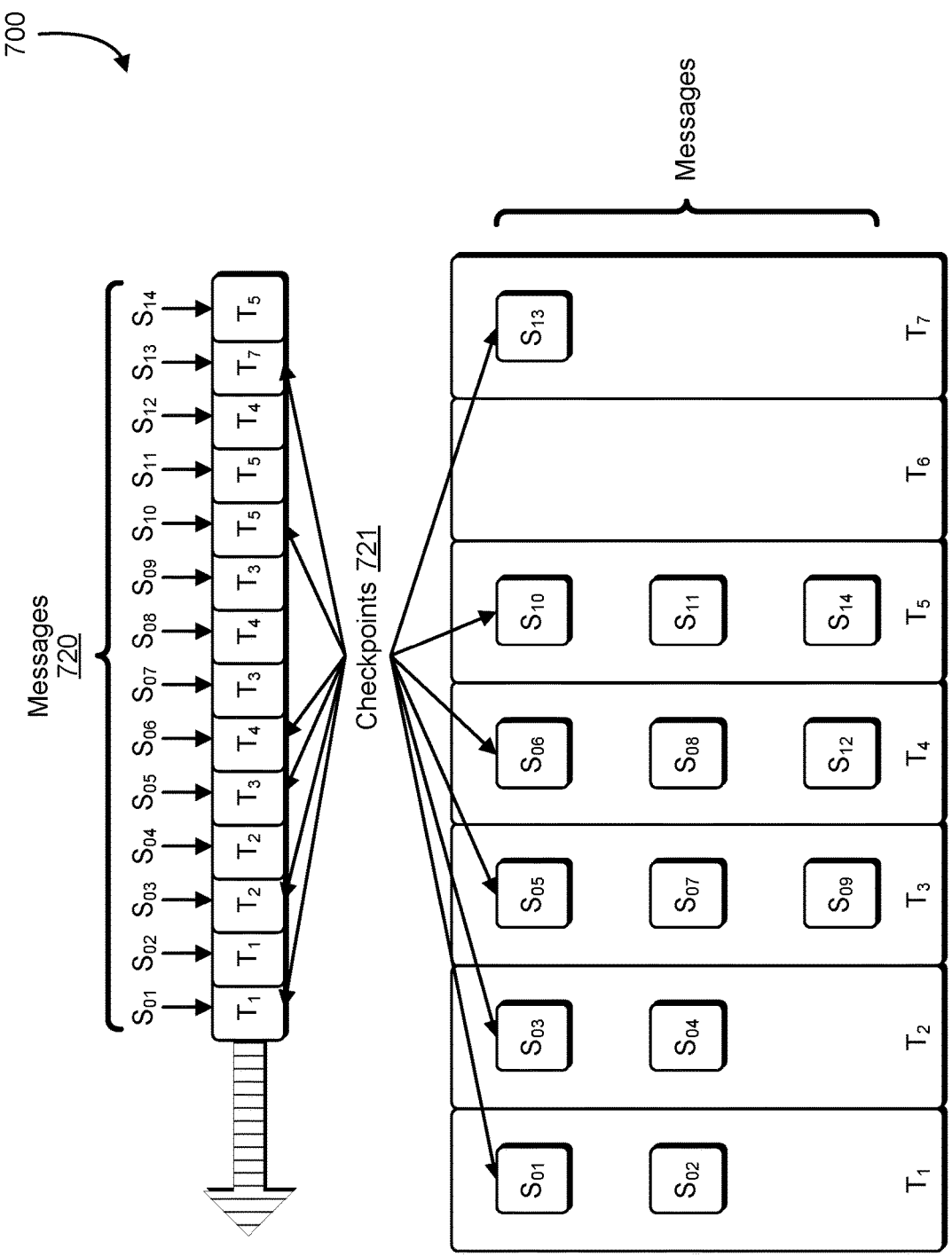
FIG. 7 illustrates an example of grouping by time window and checkpointing in accordance with an embodiment.

FIG. 7 illustrates an example 700 of grouping and checkpointing an embodiment of the present disclosure. Specifically, FIG. 7 depicts a series of streamed messages 720 received by a telemetry metrics processor, such as the telemetry metrics processor 626 of FIG. 6. Similar to FIG. 6, in the example 700, $T_1$-$T_7$ represent seven time windows and $S_{01}$-$S_{14}$ represent sequence numbers assigned to the 14 streamed messages 720 received. As shown in the example 700, a checkpoint 721 is created by the system as a result of the present time window being marked as complete. There may be an independent process (e.g., a heuristic) responsible for marking a time window as complete and rejecting records. For example, a heuristic may indicate to mark a time window as complete 100 seconds after receiving the first message for that time window. As another example, a heuristic may indicate to mark a time window as complete upon receiving a message from a subsequent time window. As another example, a heuristic may indicate to mark a time window as complete if no messages have been received for that time window within the last 20 seconds.

For example, upon receiving an indication that time window $T_1$ is complete, a first checkpoint is created to correspond to sequence number $S_{01}$. Subsequently, in the event of a host failure, retrieval of the checkpoint corresponding to sequence number $S_{01}$ informs the system that time window $T_1$ was fully processed and the system can ignore any future messages corresponding to time window $T_1$. Likewise, as a result of receiving an indication that time window $T_2$ is complete, a second checkpoint corresponding to the sequence number $S_{03}$ of time window $T_2$ may be created. If, at this point, a host failure occurs, upon recovery from the host failure, the most recent checkpoint may be retrieved (i.e., corresponding to $S_{03}$), and the system can determine that time window $T_2$ was fully processed and the system can ignore future messages for time window $T_2$. Thus, the system can resume processing messages at $S_{05}$. Checkpoint generation may continue in this manner with the checkpoints generated—at sequence number $S_{05}$ of time window $T_{03}$, at sequence number $S_{0b}$ of time window $T_{04}$, at sequence number $S_{10}$ of time window $T_{05}$, and so on.

Note that, some of the sequence numbers in time windows $T_3$-$T_7$ are out of order (e.g., fifth, seventh, and ninth messages belonging to time window $T_3$, and sixth, eighth, and $12^{th}$ messages belonging to time window $T_4$), and, in fact, no messages for time window $T_6$ were received. The presence of a time window $T_7$ message ($S_{13}$) provides some confidence that no messages are expected for time window $T_6$. If time window $T_6$ do arrive, it may be presumed that something aberrant occurred with the system (e.g., the telemetry front-end service held onto the time window $T_6$ messages for an unusually long time), and consequently such time window $T_6$ data may be discarded to mitigate the risk of contaminating the telemetry data with aberrant data. However, the system of the present disclosure, by referring to the timestamp of the message, is able to place the message in the correct time window.

Because outputting partial/incomplete time windows may result in inaccurate calculations of minimums, maximums, averages, etc., sorting and grouping messages into their respective time windows and outputting the group of messages after the time window has been determined complete ensures that telemetry metric processing is accurate. In the example 700, the system probabilistically determines that the time window is complete after a predetermined amount of time. Thus, messages collected up to and including the time window of the current checkpoint may be considered to have been processed, and subsequent messages corresponding to the outputted time window may be discarded/ignored. For example, as a result of time window $T_3$ being determined to be complete, $S_{05}$ may be checkpointed. If time window $T_3$ is determined to be complete prior to receiving messages corresponding to $S_{07}$ and/or $S_{09}$ of time window $T_3$, messages corresponding to $S_{01}$ and/or $S_{09}$ may be discarded. Likewise, if time window $T_4$ is determined to be complete after processing message corresponding to $S_{06}$ and $S_{08}$, the subsequently received messages corresponding to $S_{12}$ may be discarded. Similarly, if time window $T_5$ is determined to be complete before after messages corresponding to $S_{10}$ and $S_{11}$ are received but before the message corresponding to $S_{14}$ is received the message corresponding to $S_{14}$ may be discarded.

Even though the sequence numbers for time windows $T_3$ and $T_4$ may not be in order, checkpointing at a first sequence number of the time window allows the system to resume from failure without losing work. That is, because it can be difficult to determine when all messages for a particular time window have been received, it may be difficult to determine a sequence number of the final message for a particular time window. However, it is not difficult to determine when a first message for a particular time window has been received, which makes this event an expedient trigger for checkpointing.

Figure 8:
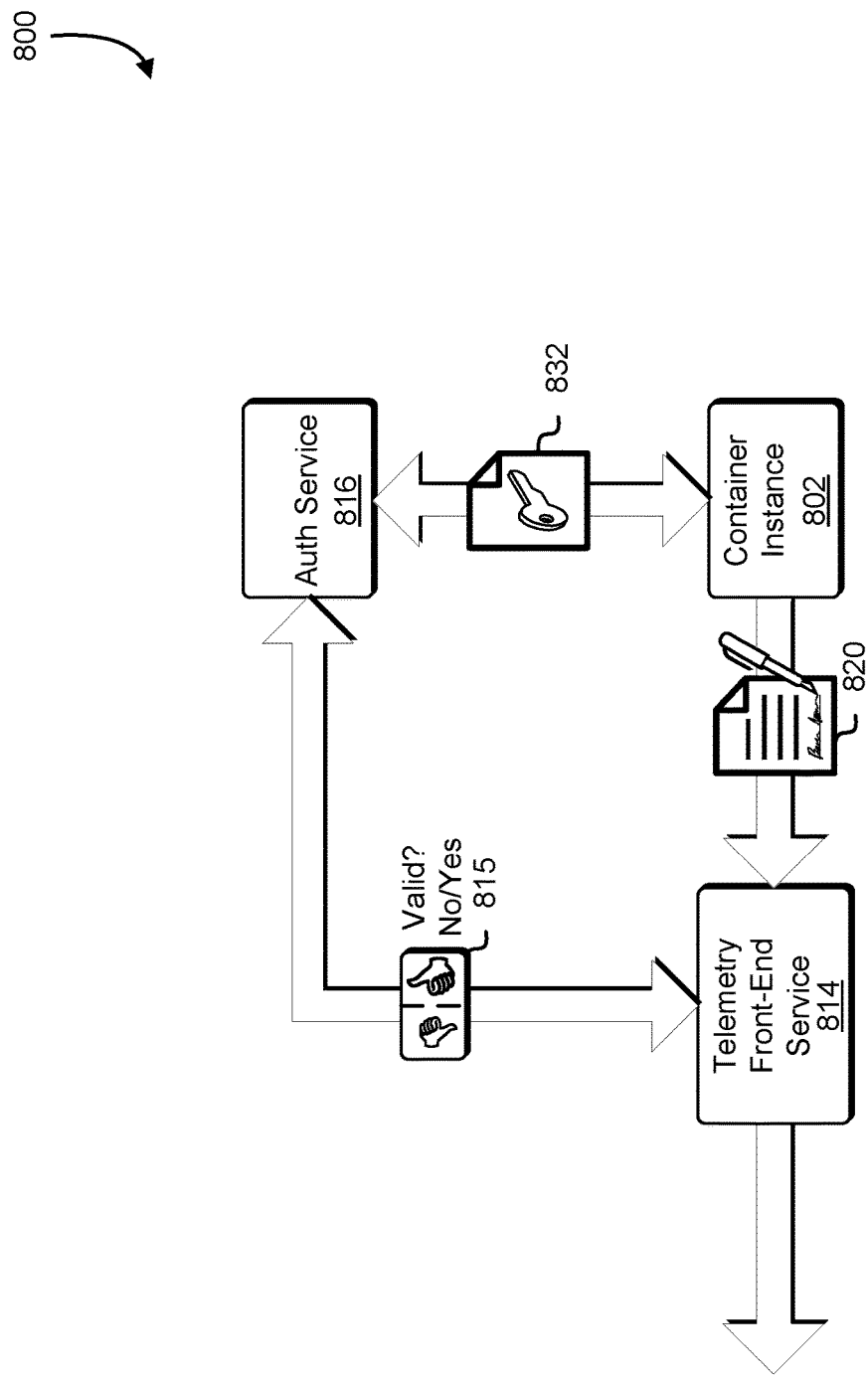
FIG. 8 illustrates an example of signed messages in accordance with an embodiment.

FIG. 8 illustrates an aspect of an environment 800 in which an embodiment may be practiced. As illustrated in FIG. 8, the environment 800 may include a container instance 802 providing a signed message 820 to a front-end service 814, the messages having been signed using a signing key 832 obtained from an authentication service. The signed message may be electronically signed in a manner similar to that described in U.S. patent application Ser. No. 13/248,953, incorporated by reference herein. As described, in some embodiments the signed messages 820 are provided to the front-end service using WebSockets protocol rather than Hypertext Transfer Protocol.

The container instance 802 may be assigned a security role based on the operations it needs to perform and based on its authority granted by or inherited from the customer associated with the cluster. The container instance 802 may request to receive a signing key from the authentication service 816, and the authentication service 816 may generate the signing key 832 based on the security role of the container instance 802 and/or other factors or restrictions, such as time-based parameters (e.g., for causing the signing key to expire after a certain time) and so on. The signing key 832 may be generated using a one-way function (e.g., a generalized cryptographic hash function).

It should be noted that the phrase "one-way function" includes functions that are not necessarily one-way in the strict mathematical sense, but that exhibit properties (such as collision resistance, preimage resistance, and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as Password-Based Key Derivation Function 2 (PB-KDF2) and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

After obtaining the signing key 832, the container instance 802 may electronically sign telemetry data to yield the signed message 820. If a WebSocket connection has not already been established, the container instance 802 may send a WebSocket handshake request (e.g., via calling StartSession( ) application programming interface) to the telemetry front-end service 814, and the telemetry front-end service 814 may establish the connection in a response to the request. Once the connection is established, the container instance 802 may send signed messages to the telemetry front-end service 814 for as long as the WebSocket connection is active.

The telemetry front-end service 814 may validate the electronic signature of the signed message 820, such as in a manner described in described in U.S. patent application Ser. No. 13/248,953, incorporated by reference (e.g., through the authentication service 816 or other authentication service, as appropriate for the implementation). In this manner, validation 815 of the signature of the telemetry data provided by the container instance 802 provides additional assurances that the telemetry has not been corrupted, replayed, or tampered with. In the event that the signed message 820 cannot be validated (e.g., the message was corrupted during transmission, the message was tampered with, the signing key expired, etc.), the telemetry front-end service 814 may discard the signed message 820 and request that the container instance 802 resend the signed message 820. In some embodiments, if the signed message 820 cannot be validated, the Web Sockets connection is terminated/closed, and the container instance 802 must re-establish a new WebSockets connection with the telemetry front-end service 814.

Figure 9:
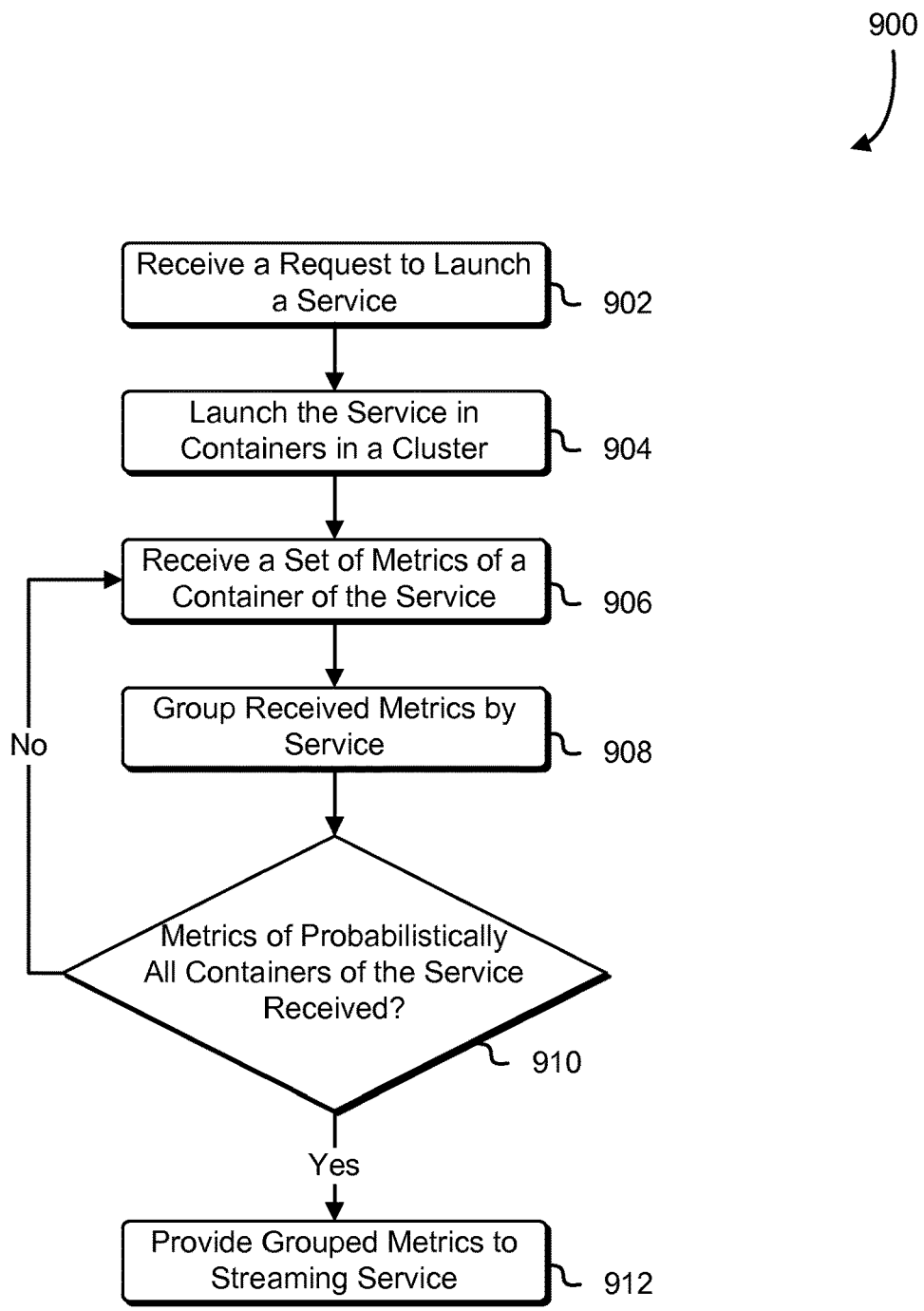
FIG. 9 is a flowchart that illustrates an example of grouping and aggregating metrics in accordance with an embodiment.

FIG. 9 is a flowchart illustrating an example of a process 900 for collecting telemetry metrics in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 13:
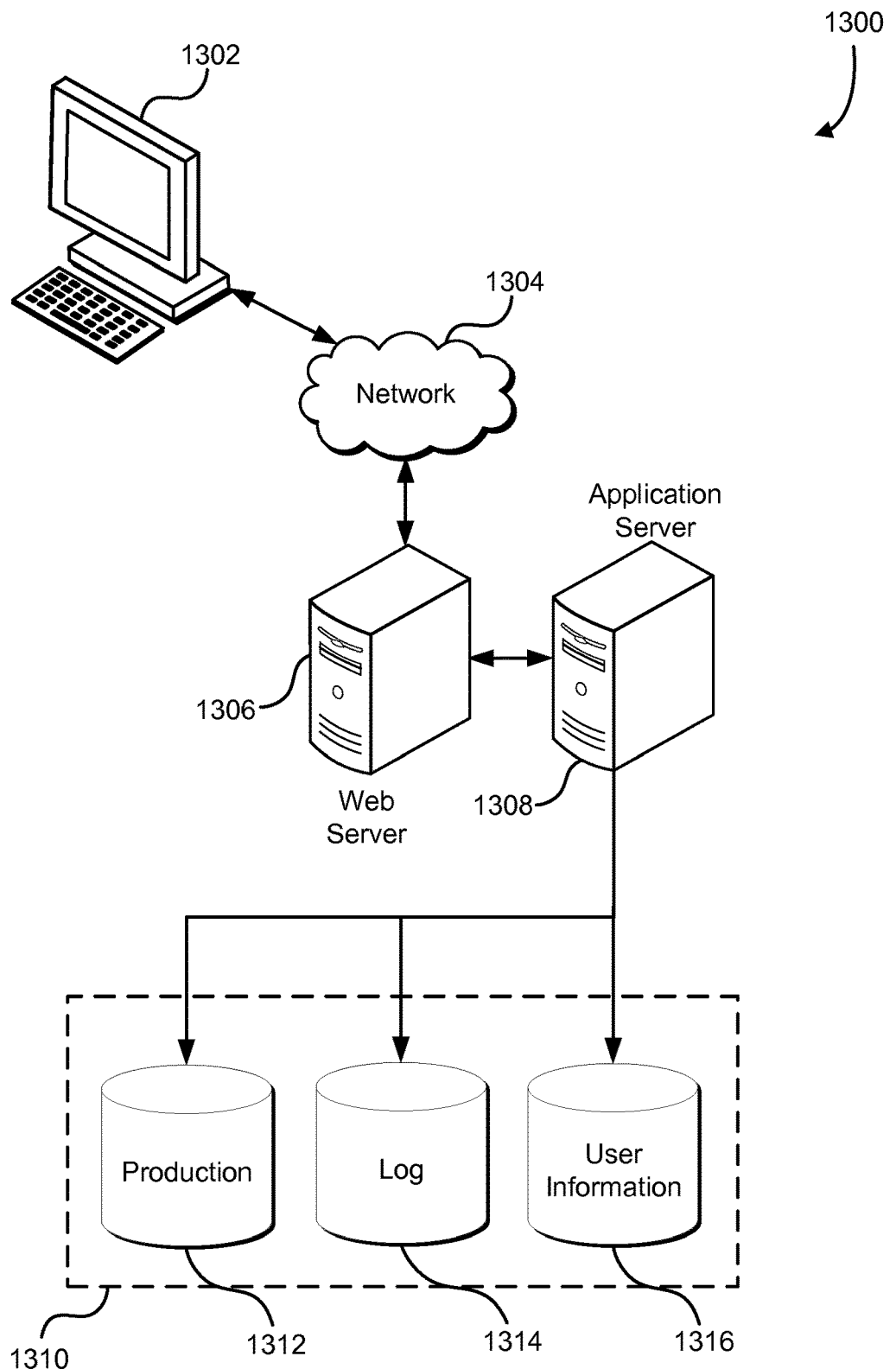
FIG. 13 illustrates an environment in which various embodiments can be implemented.

For example, some or all of process 900 may be performed by any suitable system, such as a server in a data center, by various components of the environment 1300 described in conjunction with FIG. 13, such as the web server 1306 or the application server 1308, by multiple computing devices in a distributed system of a computing resource service provider, or by any electronic client device such as the electronic client device 1302. The process 900 includes a series of operations wherein services are launched in software containers in a cluster of container instances, telemetry metrics of the software containers are received from software agents running in the container instances, the telemetry metrics are grouped by service, and the grouped telemetry metrics are provided to a streaming service for streaming to a telemetry metrics processor.

In 902, the system may receive a request to launch an application in one or more containers in a cluster of container instances as a service. In some implementations, the software application is distributed among container instances of the cluster such that each container instance hosting the application only hosts a single instance of the application. In other implementations, multiple instances of the application execute in the same container instance.

In either case, in 904, a container scheduler may be tasked with determining the container instance into which to launch the application, and cause an instance agent running in the determined container instance to launch the application as a container running in the container instance. In some implementations, the instance agent running in the container instance reports telemetry metrics that comprise various data about the running container or containers of the container instance, such as processor utilization and the memory utilization data, to a telemetry agent communication service. In other implementations, these telemetry metrics are collected and reported by a separate agent running in the container instance, referred to as a telemetry agent. Consequently, in 906, a first set of telemetry metrics may be received from a container instance.

In 908, a determination is made whether the first set of telemetry metrics corresponds to telemetry metrics already received in a certain period of time (e.g., 20 seconds, one minute, etc.) for a different software container running the same service as the software container corresponding to the first set of telemetry metrics. If so, the first set of telemetry metrics may be aggregated into the previously received telemetry metrics. Furthermore, for the extent of the certain period of time, an instance count may be performed. That is, for the duration of the certain period of time receipt of a set of telemetry metrics received from a container instance not previously counted may cause the instance counter to increment, and the instance counter is not incremented if the container instance has been previously counted.

In 910, the system performing the process 900 may determine whether, probabilistically, metrics have been received from all software containers running the service. That is, if the software agents of the container instances are configured to report telemetry metrics at intervals less than or equal to the certain period of time, upon completion of the certain period of time, it may be determined that the instance counter provides a probabilistically accurate count of the number of instances in the cluster. If it is determined that, probabilistically, telemetry metrics for all software containers of the service have yet to be received, the system may return to 906 to await receipt of more telemetry metrics. Telemetry metrics received for containers corresponding to the same service may continue to be aggregated in this manner until such time as the system determines that telemetry metrics from probabilistically all software containers executing the service have been received. In 912, as a result of the system determining that the aggregation period is complete, the system may send the aggregated telemetry metrics to a telemetry agent communication service for further processing. The system may send the aggregated telemetry metrics as a message including a timestamp indicating the current time as the time at which the message was sent. Note that one or more of the operations performed in 902-12 may be performed in various orders and combinations, including in parallel.

Figure 10:
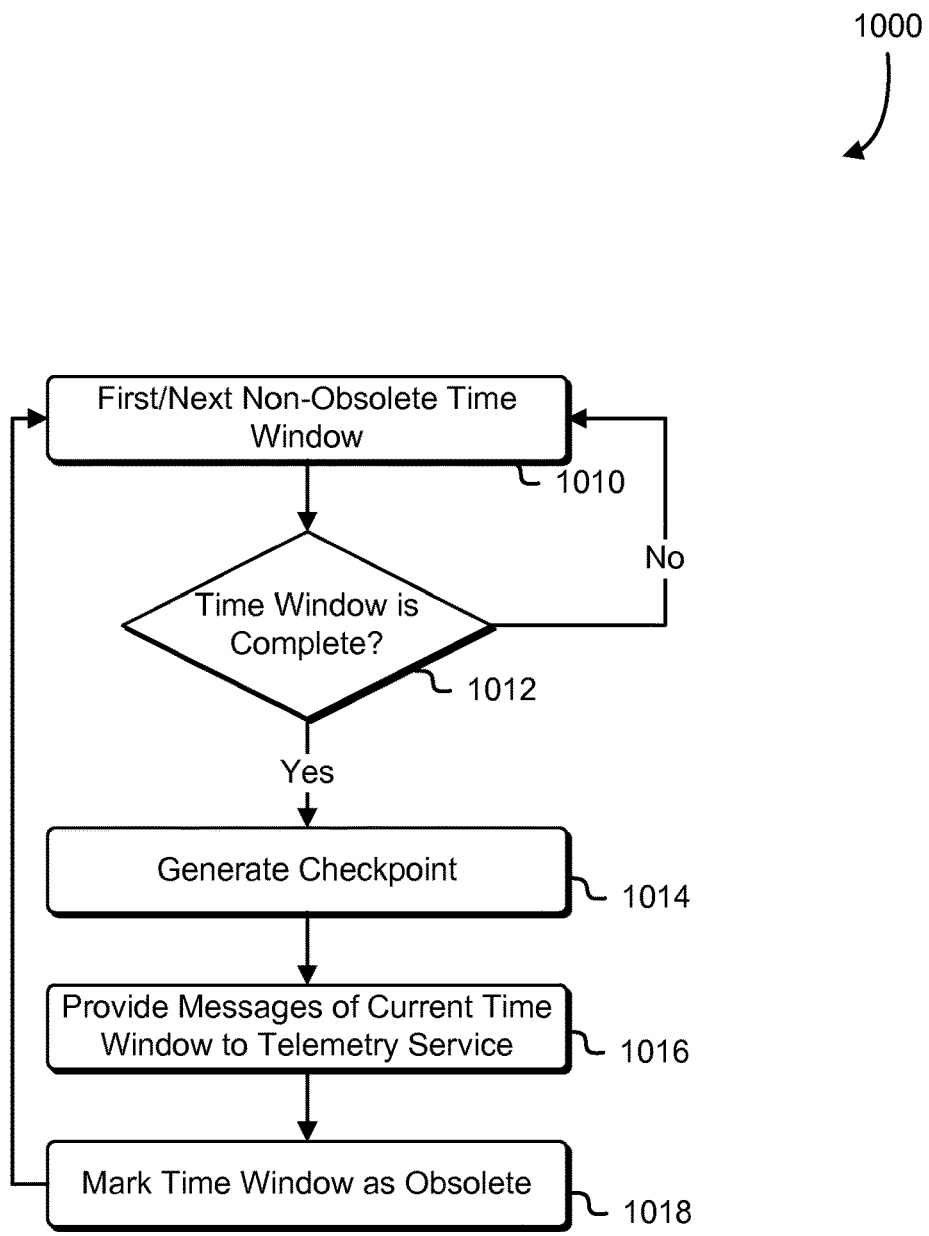
FIG. 10 is a flowchart that illustrates an example of checkpoint generation in accordance with an embodiment.

FIG. 10 is a flowchart illustrating an example of a process 1000 for checkpointing in accordance with various embodiments. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by any suitable system, such as a server in a data center, by various components of the environment 1300 described in conjunction with FIG. 13, such as the web server 1306 or the application server 1308, by multiple computing devices in a distributed system of a computing resource service provider, or by any electronic client device such as the electronic client device 1302. The process 1000 includes a series of operations wherein a determination is made whether a time window is probabilistically probablistically complete, and if so, a checkpoint is generated for the purpose of mitigating against a host failure event, the messages for the time window are sent as a batch to a telemetry service according to time window, and no further messages are accepted for that time window.

In 1010, the system performing the process 1000 examines the first non-obsolete time window (i.e., time window still flagged as actively receiving messages). In 1012, the system performing the process 1000 may apply a heuristic to probabilistically determine whether a time window is complete (e.g., 100 seconds have passed since the first message received for that time window, 20 seconds have passed since the last message received for that time window, etc.); that is, determine that sufficient time has passed such that it is more probable than not that all messages for that time window have been received. Thus, if, according to the heuristic, the system determines that the time window is not complete (i.e., allow more time for messages to be received for that time window), the system performing the process 1000 may return to 1010 to review the next time window.

Otherwise, if the system performing process 1000 determines that the time window in question is complete (i.e., no messages have been previously received for that time window), the system may proceed to 1014 to generate a checkpoint. In some examples, a "checkpoint" may refer to a progress marker indicating the most recent messages grouped or processed. For example, in an implementation where generating the checkpoint coincides with sending messages grouped according to a previous time window to a telemetry service, setting the checkpoint/progress marker to the sequence number of the first message for the new time window provides an indication that messages for the time window corresponding to the checkpoint and earlier time windows may be ignored (because those time windows have been finalized and messages for those time windows have already been provided to the telemetry service). This provides convenient closure, as, due to latency and other delays in a distributed computing environment, messages corresponding to time windows long since passed may otherwise continue to trickle into the system slowly.

In 1016, after having generated the checkpoint for the time window, messages grouped into that time window may be provided to the telemetry service. As noted, the telemetry service may perform a variety of actions based on receipt of the grouped messages, such as a report detailing resource usage by services in the cluster, alerts if resource usages fall above or below predetermined thresholds, and so on. After messages for the time window have been sent to the telemetry service, in 1018, the time window may be marked as obsolete so that further messages for that time window, if received, are discarded. Note that one or more of the operations performed in 1002-16 may be performed in various orders and combinations, including in parallel. Note too that the process 1000 may be repeated until terminated, restarting at the first still-active time window.

Figure 11:
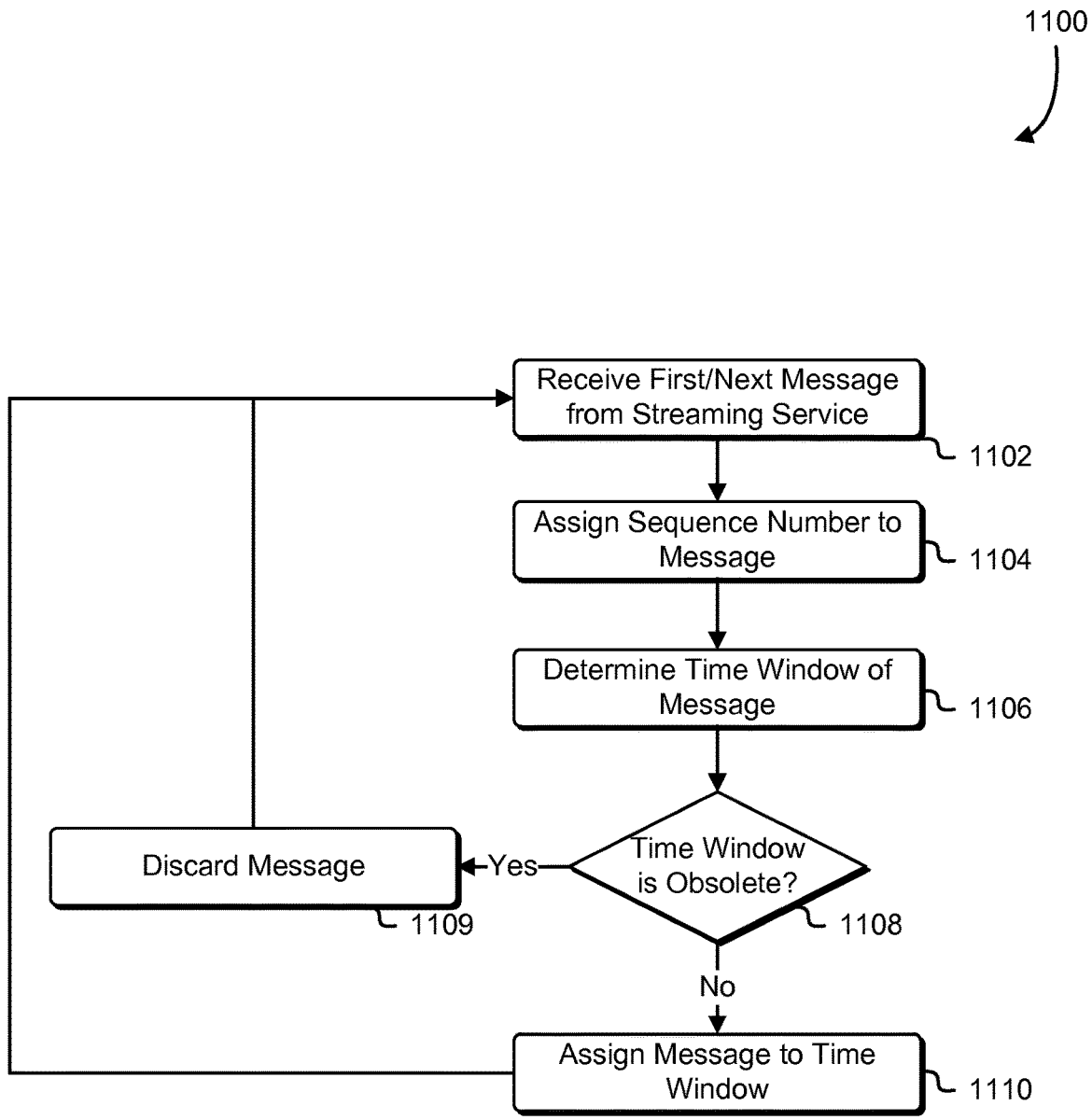
FIG. 11 is a flowchart that illustrates an example of grouping messages by time window in accordance with an embodiment.

FIG. 11 is a flowchart illustrating an example of a process 1100 for sequencing and arranging telemetry metrics messages received from a streaming service for output to telemetry service in accordance with various embodiments. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1100 may be performed by any suitable system, such as a server in a data center, by various components of the environment 1300 described in conjunction with FIG. 13, such as the web server 1306 or the application server 1308, by multiple computing devices in a distributed system of a computing resource service provider, or by any electronic client device such as the electronic client device 1302. The process 1100 includes a series of operations wherein messages are received, assigned a sequence number, and grouped according to time window.

In 1102, a message containing aggregated telemetry metrics is received from a streaming service, such as in the manner described for FIGS. 6 and 7. In 1104, the message is assigned a sequence number (e.g., by the streaming service) reflecting an approximate order in which the message was received. The sequence number may be a counter that is automatically incremented for every message received from the streaming service.

In 1106, the time window of the message is determined by examining the timestamp associated with the message. The timestamp of the message may reflect a time that the message was sent, and store that message, at least temporarily, in a group corresponding to that time window. For example, after aggregation of the telemetry metrics such as in the manner described in the process 900 of FIG. 9, the aggregated telemetry metrics may be sent as a message with the timestamp of the current time. As has been described, a time window may represent a range of time of fixed length (e.g., one minute in length, two minutes in length, etc.). The system performing the process 1100 may, periodically or upon the occurrence of certain conditions (e.g., 100 seconds have passed since the first message received for that time window, 20 seconds have passed since the last message received for that time window, etc.), determine that no more messages are to be grouped with the particular time window and may then forward the messages that had been grouped for that time window to a telemetry service, whereupon that time window may be considered obsolete and any future messages received, which correspond to that time window, may be discarded).

Consequently, 1108, if the system performing the process 1100 determines that the message corresponds to an obsolete time window, the message may be discarded in 1109, and the system may return to 1102 to receive the next message from the streaming service. Otherwise, if the system determines that the message corresponds to a time window not obsolete, in 1110, the message may be grouped by that time window, such as in the manner described for FIG. 7. Thereafter, the system performing the process 1100 may return to 1102 to await arrival of the next message.

Figure 12:
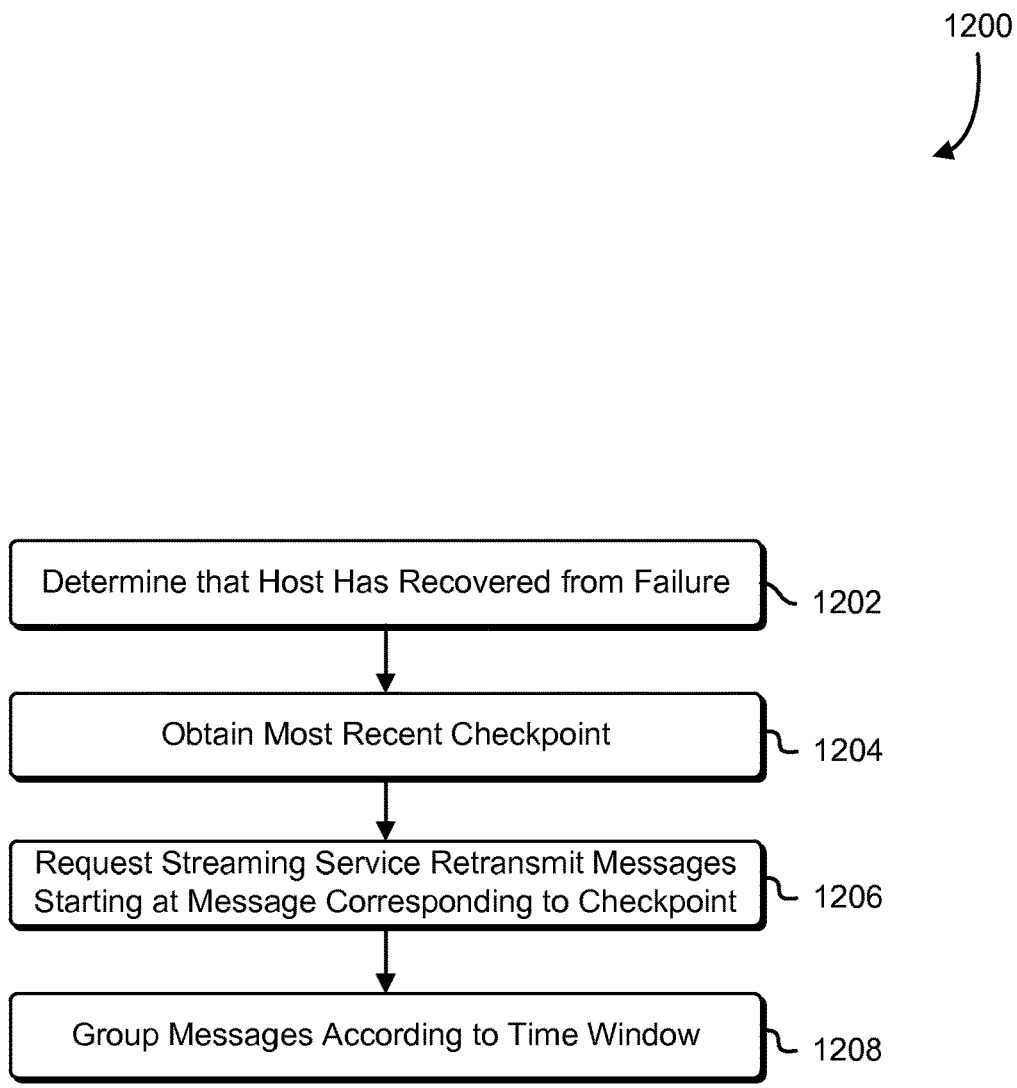
FIG. 12 is a block diagram that illustrates an example of metrics processing failure recovery in accordance with an embodiment.

FIG. 12 is a block diagram illustrating an example of a process 1200 for resuming metrics processing after recovering from host failure in accordance with various embodiments. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1200 may be performed by any suitable system, such as a server in a data center, by various components of the environment 1300 described in conjunction with FIG. 13, such as the web server 1306 or the application server 1308, by multiple computing devices in a distributed system of a computing resource service provider, or by any electronic client device such as the electronic client device 1302. The process 1200 includes a series of operations wherein most recent checkpoint is obtained, messages are retransmitted, and processing resumes at the message corresponding to the checkpoint.

In 1202, the system determines that a host for processing telemetry metric messages has recovered from failure; this determination may be made in various ways, such as detecting that a metrics processing service has restarted. In 1204, the system may obtain the most recent checkpoint. As has been described, checkpoints may be stored in a persistent data store, and consequently the most recent checkpoint may be determined with reference to a timestamp indicating when the checkpoint was stored. In 1206, the system may begin reprocessing messages received from a streaming service. That is, a request may be sent to the streaming service to retransmit/re-stream messages. In some implementations, messages are re-streamed starting from an indicated sequence number and/or some other unique message identifier, whereas, in other implementations, the streaming service streams messages in chunks, and the system performing the process 1200 may discard messages in the stream that corresponds to sequence numbers prior to the sequence number of the obtained checkpoint. For example, in some embodiments, the streaming service sequences messages before they are sent, and the system performing the process 1200 may begin reprocessing upon a match between a sequence number of the message and the sequence number of the obtained checkpoint.

In 1208, once reprocessing begins, the system performing the process 1200 may continue processing messages in accordance with the process 1100 of FIG. 11. Note that one or more of the operations performed in 1202-08 may be performed in various orders and combinations, including in parallel. Note too that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1304 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 1304 can be enabled by wired or wireless connections and combinations thereof. In this example, the network 1304 includes the Internet and/or other publicly-addressable communications network, as the environment includes a web server 1306 for receiving requests and serving content in response thereto, although for other networks an alternative device serving a similar purpose could be used as would be apparent to one of ordinary skill in the art.

The illustrative environment includes an application server 1308 and a data store 1310. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1308 can include any appropriate hardware, software and firmware for integrating with the data store 1310 as needed to execute aspects of one or more applications for the electronic client device 1302, handling some or all of the data access and business logic for an application. The application server 1308 may provide access control services in cooperation with the data store 1310 and is able to generate content including, text, graphics, audio, video and/or other content usable to be provided to the user, which may be served to the user by the web server 1306 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 1302 to provide the content in one or more forms including, forms that are perceptible to the user audibly, visually and/or through other senses. The handling of all requests and responses, as well as the delivery of content between the electronic client device 1302 and the application server 1308, can be handled by the web server 1306 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store 1310 may include mechanisms for storing production data 1312 and user information 1316, which can be used to serve content for the production side. The data store 1310 also is shown to include a mechanism for storing log data 1314, which can be used for reporting, analysis or other purposes. It should be understood that there can be many other aspects that may need to be stored in the data store 1310, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 1308. In one example, a user, through a device operated by the user, might submit a search request for a certain type of item. In this case, the data store 1310 might access the user information 1316 to verify the identity of the user and can access the catalog detail information to obtain information about items of that type. The information then can be returned to the user, such as in a results listing on a web page that the user is able to view via a browser on the electronic client device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the example environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1304 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1304. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may be configured, for instance, with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described.

Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
 receiving a request, from an entity, to launch a service in a cluster of virtual machine instances associated with an account of a customer of a computing resource service provider;
 deploying the service to the cluster by:

launching the service in a first software container executing in a first virtual machine instance of the cluster, the first software container being a first isolated user space instance; and launching the service in a second software container executing in a second virtual machine instance of the cluster, the first virtual machine instance and the second virtual machine instance being members of the cluster of virtual machine instances, and the second software container being a second isolated user space instance, the first and second software containers running respective first and second instances of the service in parallel;

obtaining, from a first software agent running on the first virtual machine instance, a first set of measurements of resource utilization by the first software container;

obtaining from a second software agent running on the second virtual machine instance, a second set of measurements of resource utilization by the second software container;

normalizing the first set of measurements to account for differences in container instance configurations between at least the first and second virtual machine instances and based at least in part on resources allocated to the first virtual machine instances to yield a first set of normalized measurements, wherein said normalizing the first set of measurements includes multiplying resource utilization of the first software container by a total resource allocation of the first software container divided by collective resources of the cluster;

normalizing the second set of measurements to account for the differences in the container instance configurations between at least the first and second virtual machine instances and based at least in part on resources allocated to the second virtual machine instance to yield a second set of normalized measurements, where said normalizing of the second set of measurements includes multiplying resource utilization of the second software container multiplied by a total resource allocation of the second software container divided by the collective resources of the cluster;

as a result of determining that the first software container and the second software container are executing a same software application, aggregating the first set of normalized measurements and the second set of normalized measurements to yield an aggregated set of measurements;

streaming the aggregated set of measurements to a telemetry metrics processor, as a streamed message, for output to the entity; and modifying the amount of virtual machine instances of the cluster based at least in part on the aggregated set of measurements.

2. The computer-implemented method of claim 1, wherein:

the entity is a workload scheduler that makes a determination of which virtual machine of the cluster of virtual machine instances is to be allocated a next workload; and the determination is made based at least in part on the streamed message.

3. The computer-implemented method of claim 1, wherein modifying the amount of virtual machine instances of the cluster based at least in part on the aggregated set of measurements further comprises determining whether to add a virtual machine instance to the cluster or remove a virtual machine instance from the cluster based at least in part on the set of aggregated measurements.

4. The computer-implemented method of claim 1, wherein:

the set of aggregated measurements is a second set of aggregated measurements; and determining whether to add a virtual machine instance to the cluster or remove a virtual machine instance from the cluster includes:

obtaining, before deploying the service to the cluster, a first utilization measurement based at least in part on a first set of aggregated measurements;

obtaining a second utilization measurement based at least in part on the second set of aggregated measurements; and determining, depending at least in part on a difference between the second utilization measurement and the first utilization measurement, to roll back the service from the cluster.

5. The computer-implemented method of claim 1, further comprising normalizing the first set of measurements and the second set of measurements is based at least in part on a size of the cluster.

6. The computer-implemented method of claim 1, wherein the aggregated set of measurements is electronically signed using a signing key, the signing key generated using a preimage resistant function.

7. The computer-implemented method of claim 1, further comprising:

as result of a determination that a time window corresponding to the aggregated set of measurements is complete:

generating a checkpoint corresponding to the streamed message; and storing the checkpoint in a persistent data store.

8. A system, comprising:

a telemetry front-end service, including one or more first processors and first memory including first instructions that, as a result of execution by the one or more first processors, cause the telemetry front-end service to:

obtain, from a virtual computer system service, a first set of measurements corresponding to resource utilization by a first software container and a second set of measurements corresponding to resource utilization by a second software container, the first and second software containers being isolated virtualization instances and running respective first and second instances of a service in parallel;

as a result of determining that the first software container and the second software container are executing a same software application, aggregate the first set of measurements and the second set of measurements to yield an aggregated set of measurements, the first set of measurements and the second set of measurements normalized based at least in part on differences in container instance configurations between at least the first and second instances of the service running in parallel and based at least in part on a current resource utilization of the first container instance and a total resource allocation of the first container instance compared to collective resources of a cluster of container instances, wherein said normalizing the first set of measurements includes multiplying resource utilization of the first software container by a total resource allocation of the first software container divided by collective resources of the cluster; and provide a timestamp and the aggregated set of measurements; and a telemetry metrics processing service, including one or more second processors and second memory including second instructions that, as a result of execution by the one or more second processors, cause the telemetry metrics processing service to:
  group, in a group of measurements corresponding to a particular window of time, the aggregated set of measurements based at least in part on the timestamp;
  output the group of measurements; and
  cause an operation based at least in part on the group of measurements to be initiated.

9. The system of claim 8, wherein:
the system further comprises a data streaming service, including one or more fourth processors and fourth memory including fourth instructions that, as a result of execution by the one or more fourth processors, cause the data streaming service to:
  obtain the timestamp and the aggregated set of measurements from the telemetry front-end service;
  assign a sequence value to the aggregated set of measurements; and
  provide the timestamp and the aggregated set of measurements to the telemetry metrics processing service.

10. The system of claim 8, wherein the first instructions further include instructions that cause the virtual computer system service to:
  provide the first set of measurements to the telemetry front-end service through a first WebSockets protocol connection between an instance of the first software container and the telemetry front-end service; and
  provide the second set of measurements to the telemetry front-end service through a second WebSockets protocol connection between an instance of the second software container and the telemetry front-end service.

11. The system of claim 8, wherein:
the first instructions further include instructions that cause the virtual computer system service to obtain a signing key from an authentication service; and
the first instructions that cause the virtual computer system service to provide the first set of measurements and provide the second set of measurements include instructions that cause the virtual computer system service to:
  provide the first set of measurements with a first electronic signature signed using the signing key; and
  provide the second set of measurements with a second electronic signature signed using the signing key.

12. The system of claim 11, wherein the second instructions that aggregate the first set of measurements and the second set of measurements include instructions that cause the telemetry front-end service to aggregate the first set of measurements and the second set of measurements dependent upon successful validation of the first electronic signature and the second electronic signature.

13. The system of claim 11, wherein:
the first set of measurements is obtained through a first communications channel;
the second set of measurements is obtained through a second communications channel; and
the second instructions include instructions that cause the telemetry front-end service to:
  obtain a third set of measurements through a third communications channel; and
  depending at least in part on unsuccessful validation of an electronic signature for the third set of measurements:
    discard the third set of measurements; and
    close the third communications channel.

14. A set of one or more non-transitory computer-readable storage media having stored thereon executable instructions that, as a result of being executed by one or more processors of a computer system, cause the computer system to at least:
  launch a plurality of parallel instances of a software application in a set of software containers that are distributed among a set of virtual machine instances, each software container of the set of software containers being isolated from other processes running in a respective virtual machine;
  obtain a set of measurements corresponding to a software container of the set of software containers;
  generate a timestamp for the set of measurements;
  aggregate, with other sets of measurements corresponding to the set of software containers for the application, the set of measurements into a set of aggregated measurements and normalized based at least in part on configuration differences between the plurality of parallel instances of the software application in the set of software containers and based at least in part on a current resource utilization of the software container, a total resource allocation of the software container and collective resources of the set of software containers, wherein said normalizing the set of measurements includes multiplying resource utilization of the software container by a total resource allocation of the software container divided by collective resources of the set of software containers;
  group, in a time window group, the set of aggregated measurements based at least in part on the timestamp;
  as a result of fulfillment of a condition, output the time window group; and
  cause an operation based at least in part on the time window group outputted.

15. The set of one or more non-transitory computer-readable storage media of claim 14, wherein the executable instructions further cause the computer system to:
  generate a second timestamp for a second set of measurements;
  determine, based at least in part on the second timestamp, that the second set of measurements corresponds to the time window group; and
  further as a result of fulfillment of the condition:
    determine that the time window group is obsolete; and
    discard the second set of measurements.

16. The set of one or more non-transitory computer-readable storage media of claim 14, wherein the instructions that cause the computer system to cause an operation based at least in part on the time window group outputted further cause the computer system to determine whether to add a virtual machine instance to the set of virtual machine instances or remove a virtual machine instance from the set of virtual machine instances.

17. The set of one or more non-transitory computer-readable storage media of claim 14, wherein the condition is fulfilled if a predetermined time interval has occurred since receiving the set of aggregated measurements.

18. The set of one or more non-transitory computer-readable storage media of claim 17, wherein further as the result of fulfillment of the condition:

generate a checkpoint that indicates the time window group as a most recently outputted time window group; and store the checkpoint in a persistent data store.

19. The set of one or more non-transitory computer-readable storage media of claim 18, wherein the executable instructions further include executable instructions that cause the computer system to:

determine that the computer system has recovered from a failure; and obtain a second set of aggregated measurements having a second timestamp that corresponds to a second time window group, the second time window group corresponding to a second time period occurring after a first time period of the time window group indicated by the checkpoint.

20. The set of one or more non-transitory computer-readable storage media of claim wherein:

the executable instructions further include executable instructions that cause the computer system to assign a sequence number to the set of aggregated measurements, the sequence number corresponding to an order of the set of aggregated measurements in a data stream; and the checkpoint is generated to correspond to the sequence number.

* * * * *